(12) United States Patent
Jin

(10) Patent No.: US 7,599,270 B2
(45) Date of Patent: Oct. 6, 2009

(54) OPTICAL DISC STORAGE SYSTEMS AND METHODS UTILIZING FREQUENCY PREDICTIVE WOBBLE SIGNAL DETECTION

(75) Inventor: Woo-Kang Jin, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 815 days.

(21) Appl. No.: 10/968,393

(22) Filed: Oct. 19, 2004

(65) Prior Publication Data
US 2006/0044961 A1 Mar. 2, 2006

(30) Foreign Application Priority Data
Aug. 10, 2004 (KR) ........................ 10-2004-0062771

(51) Int. Cl.
*G11B 7/00* (2006.01)
(52) U.S. Cl. .............. 369/53.34; 369/44.13; 369/59.22; 369/275.4
(58) Field of Classification Search .............. 369/44.13, 369/47.13, 47.46, 59.22, 275.4
See application file for complete search history.

(56) References Cited

U.S. PATENT DOCUMENTS

| | | | | |
|---|---|---|---|---|
| 5,163,035 A | * | 11/1992 | Horikiri .................... | 369/47.39 |
| 5,619,484 A | * | 4/1997 | Yokota et al. .............. | 369/47.4 |
| 6,011,770 A | * | 1/2000 | Tan ......................... | 369/124.13 |
| 6,088,307 A | * | 7/2000 | Fushimi et al. .......... | 369/44.13 |
| 6,101,163 A | * | 8/2000 | Kanno et al. ............. | 369/124.1 |
| 6,246,649 B1 | * | 6/2001 | Ohta et al. ............... | 369/47.28 |
| 6,560,172 B1 | | 5/2003 | Nakajo ..................... | 369/44.13 |
| 6,590,844 B2 | * | 7/2003 | Fujita et al. .............. | 369/53.19 |
| 6,674,330 B2 | | 1/2004 | Bokui et al. .................. | 331/11 |
| 6,987,719 B2 | * | 1/2006 | Mashimo ................. | 369/53.34 |
| 7,200,093 B2 | * | 4/2007 | Hsiao et al. .............. | 369/59.19 |
| 2002/0085472 A1 | * | 7/2002 | Mashimo ................. | 369/59.17 |
| 2003/0007586 A1 | * | 1/2003 | Ishii .......................... | 375/376 |
| 2004/0145983 A1 | * | 7/2004 | Ide et al. .................. | 369/47.28 |
| 2005/0025009 A1 | * | 2/2005 | Ono ........................ | 369/47.25 |

OTHER PUBLICATIONS

Cheever, Erik "Switched Capacitor Circuits" *Swarthmore College Website* http://www.swarthmore.edu/natSci/echeeve1/Ref/Filter_Bkgrnd/SwitchedCap.html, 1999.
Lacanette, Kerry "A Basic Introduction to Filters—Active, Passive, and Switched-Capacitor" *National Semiconductor Corporation Application Note 779* (1991).

* cited by examiner

*Primary Examiner*—Wayne R Young
*Assistant Examiner*—Linh T Nguyen
(74) *Attorney, Agent, or Firm*—Myers Bigel Sibley & Sajovec

(57) ABSTRACT

A wobble signal for an optical storage device is generated by adjusting a center frequency ($\omega_0$) of a band pass filter based on an expected frequency of the wobble signal and/or an estimated position of a pick-up apparatus and filtering an input signal corresponding to the wobble signal from the pick-up apparatus with the adjusted band pass filter to provide the wobble signal. Adjusting the center frequency ($\omega_0$) of the band pass filter may also be based on a measured phase change of the band pass filter. Systems for generating a wobble signal, wobble signal detection circuits and optical storage devices are also provided.

56 Claims, 12 Drawing Sheets

OPTICAL DISC STORAGE SYSTEMS AND METHODS UTILIZING FREQUENCY PREDICTIVE WOBBLE SIGNAL DETECTION

CLAIM OF PRIORITY

This application claims priority from Korean Patent Application No. 2004-62771, filed on Aug. 10, 2004 in the Korean Intellectual Property Office, the contents of which are hereby incorporated by reference in their entirety as if set forth fully herein.

FIELD OF THE INVENTION

The present invention relates to optical storage devices and more particularly to detection of a wobble track from an optical storage device.

BACKGROUND OF THE INVENTION

An optical disc reproducing/recording system, such as a compact disc player (CDP), a Digital Video Disc Player (DVDP), a CD-RW (Rewritable Compact Disc), a CD-ROM (Compact Disc Read Only Memory), a CD-R (Recordable compact disc), a DVD-RAM, or a DVD-ROM inlay (damascene), generally applies laser light to a disc track to encode information in the track or read encoded information from the track. The track typically has information encoded in it so that the reflection of light from the track may be read to extract the coded information.

FIG. 1 illustrates a conventional optical disc 100 with marked sectors. As seen in FIG. 1, a sector of the optical disc 100 may have an identification unit 110 and a track unit 120. The length of the sectors is typically about several nanometers. The grooves of a track are provided in a wave or undulating pattern. The undulating pattern of a groove may be detected to generate a wobble signal at a wobble frequency. The detected wobble signal may be used as track position information when tracing a disc track and may be used as a basic signal in generating a timing clock signal. Characteristics of a wobble signal for a disc may vary with disc type.

Optical discs have conventionally been operated in two different modes. In normal speed operation, the disc may be operated in a Constant Linear Velocity (CLV) mode, where the linear velocity of the disc is maintained at a constant velocity based on where an optical pick-up assembly is reading from the disc. In such a case, the wobble signal may have a constant frequency.

Optical discs may also be operated in a high speed mode, where the disc is rotated at a constant speed. This mode is typically referred to as Constant Angular Velocity (CAV) mode. Because the disc is rotated at a constant angular velocity, the frequency of the wobble signal for tracks may vary based on the position on the disc. For example, the signal at the inner portion of the disc may be a lower frequency signal than at the outer portion of the disc because the inner portion of the disc is moving at a lower linear velocity than the outer portion of the disc. One example of the use of a wobble signal for position determination is the Address in Pre-groove (ADIP) signal that is used as data position information for DVD+R/RW. At normal speed, the ADIP signal frequency is defined as 817 KHz, while at 18× speed, the frequency is defined as 14.7 MHz.

FIG. 2 illustrates a conventional wobble signal detector 200. In the conventional wobble signal detector 200 of FIG. 2, a band pass filter (BPF) 210 is used to reduce or eliminate unnecessary noise from an input signal (RF signal) generated from a pick-up apparatus that detects a signal corresponding to a wobble signal frequency band. A comparator 220 converts an output signal of the BPF 210 into a digital signal level signal. A phase-locked loop (PLL) 230 locks to the output of the comparator to output a wobble signal.

In conventional optical disc devices, the BPF 210 may be provided by a switched capacitor filter (SCF). A SCF may provided relatively high accuracy (e.g. ±5%) and a high Q (Quality) factor. In a switched capacitor filter, a filter is provided without an inductive component by switching between capacitors. The signal that controls the switching between the capacitors may be generated using an Operational Amplifier (Op Amp) included in the BPF 210. However, the Op Amp may need to provide stable operation at 75 times the maximum frequency of the wobble signal, or up to more than 1 GHz. Furthermore, as Q for the SCF is increased, the bandwidth of the Op Amp may also need to increase. As an example, if the wobble signal to be detected is 15 MHz, the clock frequency for the SCF will typically be about 15 times the center frequency of the filter, or about 225 MHz. To assure proper operation, the bandwidth of the Op Amp may be about five times the filter frequency, or more than 1 GHz. Providing an Op Amp with such a high bandwidth may be difficult with current complementary metal oxide semiconductor (CMOS) technology because of chip size and power consumption issues. For high frequency operation, a Gm-C filter has been used as the BPF 210 in a DVD+R/RW optical disc system to detect a high frequency wobble signal. The Gm-C filter output characteristic is determined by its capacitance (C) and self transconductance (Gm). However, Gm-C filters may be sensitive to the manufacturing process, power noise, temperature variation and parasitic RC load and may provide an accuracy of only about ±30%. Thus, Gm-C filters have typically been used with a PLL with a voltage controlled oscillator (VCO) for calibration operation. However, the use of a PLL with VCO may also increase circuit size and power consumption.

SUMMARY OF THE INVENTION

Some embodiments of the present invention provide systems for generating a wobble signal from an optical disc that include a system controller configured to generate a frequency control signal corresponding to an expected frequency of a wobble signal read from the optical disc. A wobble signal detection circuit is configured to adjust a center frequency ($\omega_0$) of a band pass filter responsive to the frequency control signal, receive an input signal corresponding to the wobble signal read from the optical disc and band pass filter the input signal utilizing the adjusted center frequency to provide an output wobble signal.

In further embodiments of the present invention, the wobble signal detection circuit is further configured to measure a phase change in the band pass filter and adjust $\omega_0$ of the band pass filter to reduce the measured phase change. The band pass filter of the wobble signal detection circuit may include a transconductance-capacitance (Gm-C) filter. The wobble signal detection circuit may be further configured to adjust the transconductance of the transconductance-capacitance filter based on the control signal and the measured phase change to adjust $\omega_0$ of the band pass filter.

In additional embodiments of the present invention where the frequency control signal is a reference frequency control voltage corresponding to an expected frequency of the wobble signal, the wobble signal detection circuit includes a band pass filter having an adjustable center frequency ($\omega_0$) responsive to a target frequency control voltage. A frequency calibration control unit is configured to combine the reference frequency control voltage and a phase change voltage corresponding to a detected phase change of the band pass filter to provide the target frequency control voltage. The band pass filter may include a plurality of serially connected band pass filters, each having an adjustable center frequency responsive to the target frequency control voltage.

In additional embodiments of the present invention, the frequency calibration control unit includes a phase detection circuit coupled between an input and an output of at least one of the serially connected band pass filters. A charge pump is responsive to the phase change detection circuit and configured to output a current based on the output of the phase detection circuit. A loop filter has an input coupled to the charge pump and an output corresponding to the filtered output of the charge pump. A band pass filter control voltage generator is configured to receive the output of the loop filter and the reference frequency control voltage and output the target frequency control voltage to each of the serially connected band pass filters.

The loop filter may include an RC filter including a resistance (R) coupled between an output of the charge pump and a reference voltage and a capacitance (C) coupled between the output of the charge pump and a ground voltage.

The frequency calibration control unit may further include a first comparator coupled between an output of at least one of the serially connected band pass filters and the phase detection circuit configured to compare an output of the one of the serially connected band pass filters to a reference voltage and output a signal corresponding to a difference between the output of the one of the serially connected band pass filters and the reference voltage to the phase detection circuit. A second comparator coupled between an input of the at least one of the serially connected band pass filters and the phase detection circuit is configured to compare an input of the one of the serially connected band pass filters to the reference voltage and output a signal corresponding to the difference between the input of the one of the serially connected band pass filters and the reference voltage to the phase detection circuit.

In additional embodiments of the present invention, the band pass filter control voltage generator includes a first band pass filter transconductance control circuit coupled to the output of the loop filter and configured to output a first voltage corresponding to the output of the loop filter. A second band pass filter transconductance control circuit has as an input the reference frequency control voltage and is configured to output a second voltage corresponding to the reference frequency control voltage. A voltage summing circuit is configured to sum the first and second voltages to provide the target frequency control voltage. Each of the first and second band pass filter transconductance control circuits may include a buffer amplifier coupled to an input of the band pass filter transconductance control circuit, an operational amplifier having a first input coupled to the reference voltage and a second input coupled to the output of the buffer amplifier, a transconductance amplifier coupled to the output of the operational amplifier and a current to voltage converter coupled to the output of the transconductance amplifier to provide an output voltage of the band pass filter transconductance control circuit. Furthermore, a first output of the buffer amplifier may be coupled to the operational amplifier through a first resistance, the reference voltage may be coupled to the operational amplifier through a second resistance, a first output of the operational amplifier may be coupled to a first input of the operational amplifier through a third resistance and a second output of the operational amplifier may be coupled to a second input of the operational amplifier through a fourth resistance.

In other embodiments of the present invention, the system controller is further configured to selectively generate the frequency control signal based on a measure of the frequency of the wobble signal or an initial position estimate independent of a measure of the wobble signal. The frequency control signal may be generated from the initial position estimate during an initial state of operation or may be generated if a jump in a reading or writing position is detected. The position estimate based on a measure of the frequency may be based on a value of a partial response maximum likelihood (PRML) read register.

In additional embodiments of the present invention, the system controller includes a wobble counter, a register responsive to the wobble counter and a microcontroller configured to output a first value corresponding to an expected frequency based on the generated wobble signal and to detect an initial state of the optical disc or a jump in tracking of the optical disc and generate a jump control signal. A firmware control unit is configured to provide a second expected frequency value responsive to the jump control signal from the microcontroller. A multiplexer is responsive to the microcontroller for selecting between the first expected frequency value of the microcontroller and second expected frequency value of the firmware control unit. A digital to analog converter is coupled to the output of the multiplexer to convert the selected expected frequency value to generate the frequency control signal. The second expected frequency value and the first expected frequency value may be values corresponding to a frequency of the wobble signal associated with an estimated position of a pick-up apparatus.

In some embodiments of the present invention, the system controller is configured to provide a first mode of operation where the frequency control signal is generated based on a position of a pick-up apparatus of the optical storage device and a second mode of operation where the frequency control signal is generated based on the generated wobble signal.

Some embodiments of the present invention provide for generating a wobble signal for an optical storage device by adjusting a center frequency ($\omega_0$) of a band pass filter based on an expected frequency of the wobble signal and filtering an input signal corresponding to the wobble signal with the adjusted band pass filter to provide the wobble signal. Adjusting the center frequency ($\omega_0$) of the band pass filter may also be based on a measured phase change of the band pass filter.

In additional embodiments of the present invention, an initial position of an optical pick-up apparatus is estimated and an expected frequency is determined based on the estimated initial position of the optical pick-up apparatus. The initial position may be a position of the optical pick-up apparatus when the optical storage device is in an initial state. The initial position may be a position of the optical pick-up apparatus after a jump in tracking of the optical pick-up apparatus.

In further embodiments of the present invention, the wobble signal is measured and the expected frequency is determined based on the measured wobble signal.

Additional embodiments of the present invention include determining the expected frequency based on an estimated position of an optical pick-up apparatus if the optical storage device is in an initial state, determining the expected frequency based on an estimated position of an optical pick-up apparatus responsive to a jump in tracking of the optical pick-up apparatus of the optical storage device and determining the expected frequency based on a measured wobble signal if the expected frequency is not determined based on an estimated position of the optical pick-up apparatus. Additionally, it may be determined if adjustments to the center frequency of the band pass filter have reached a steady state and, if so, the determination of the expected frequency may be switched from being based on an estimated position of the optical pick-up apparatus to being based on a measure of the wobble signal.

Determining if adjustments to the center frequency of the band pass filter have reached a steady state may be provided by waiting a predetermined time after the initial state of the optical storage device or after a jump in tracking of the optical pick-up apparatus and/or determining if a deviation in successive adjustment values to the band pass filter is within a predetermined threshold.

In additional embodiments of the present invention, adjusting the center frequency includes adjusting a transconductance of a transconductance-capacitance (Gm-C) band pass filter based on the expected frequency of the wobble signal and the measured phase change of the band pass filter. Adjusting the center frequency may include combining a reference frequency control signal corresponding to an expected frequency of the wobble signal and a phase change signal corresponding to a detected phase change of the band pass filter and adjusting the center frequency based on the combination of the reference frequency control signal and the phase change signal.

Some embodiments of the present invention provide a wobble detection circuit for generating a wobble signal for an optical storage device that includes a band pass filter having an adjustable center frequency ($\omega_0$) responsive to a target frequency control voltage and a frequency calibration control unit configured to combine a reference frequency control voltage corresponding to an expected frequency of a wobble signal and a phase change voltage corresponding to a detected phase change of the band pass filter to provide the target frequency control voltage. The band pass filter may include a plurality of serially connected band pass filters, each having an adjustable center frequency responsive to the target frequency signal. The plurality of serially connected band pass filters may be provided by a plurality of Gm-C filters and the center frequency of the Gm-C filters is adjusted by adjusting the self transconductance of transconductance amplifiers of the filters.

In additional embodiments of the present invention, the frequency calibration control unit includes a phase detection circuit coupled between an input and an output of one of the serially connected band pass filters, a charge pump responsive to the phase change detection circuit and configured to output a current based on the output of the phase detection circuit, a loop filter having an input coupled to the charge pump and an output corresponding to the filtered output of the charge pump and a band pass filter control voltage generator configured to receive the output of the loop filter and the reference frequency control voltage and output the target frequency control voltage to each of the serially connected band pass filters. The frequency calibration control unit further may also include a first comparator coupled between an output of the one of the serially connected band pass filters and the phase detection circuit configured to compare an output of the one of the serially connected band pass filters to a reference voltage and output a signal corresponding to a difference between the output of the one of the serially connected band pass filters and the reference voltage to the phase detection circuit and a second comparator coupled between an input of the one of the serially connected band pass filters and the phase detection circuit configured to compare an input of the one of the serially connected band pass filters to the reference voltage and output a signal corresponding to the difference between the input of the one of the serially connected band pass filters and the reference voltage to the phase detection circuit.

The loop filter may include an RC filter including a resistance (R) coupled between an output of the charge pump and a reference voltage and a capacitance (C) coupled between the output of the charge pump and a ground voltage. The band pass filter control voltage generator may include a first band pass filter transconductance control circuit coupled to the output of the loop filter and configured to output a first voltage corresponding to the output of the loop filter, a second band pass filter transconductance control circuit having as an input the reference frequency control voltage and configured to output a second voltage corresponding to the reference frequency control voltage and a voltage summing circuit configured to sum the first and second voltages to provide the target frequency control voltage.

Each of the first and second band pass filter transconductance control circuits may include a buffer amplifier coupled to an input of the band pass filter transconductance control circuit, an operational amplifier having a first input coupled to the reference voltage and a second input coupled to the output of the buffer amplifier, a transconductance amplifier coupled to the output of the operational amplifier and a current to voltage converter coupled to the output of the transconductance amplifier to provide an output voltage of the band pass filter transconductance control circuit.

In particular embodiments of the present invention, a first output of the buffer amplifier is coupled to the operational amplifier through a first resistance, the reference voltage is coupled to the operational amplifier through a second resistance, a first output of the operational amplifier is coupled to a first input of the operational amplifier through a third resistance and a second output of the operational amplifier is coupled to a second input of the operational amplifier through a fourth resistance.

In some embodiments of the present invention, a system for generating a wobble signal from an optical disc includes a system controller configured to generate a frequency control signal corresponding to an estimated position of an optical pick-up apparatus with respect to the optical disk and a wobble signal detection circuit configured to adjust a center frequency ($\omega_0$) of a band pass filter responsive to the control signal, receive an input signal corresponding to the wobble signal read from the optical disc and band pass filter the input signal utilizing the adjusted center frequency to provide an output wobble signal. The wobble signal detection circuit may be further configured to measure a phase change in the band pass filter and adjust $\omega_0$ of the band pass filter to reduce the measured phase change.

In additional embodiments of the present invention, the band pass filter of the wobble signal detection circuit includes a transconductance-capacitance (Gm-C) filter. The wobble signal detection circuit may be further configured to adjust the transconductance of the transconductance-capacitance filter based on the control signal and the measured phase change to adjust $\omega_0$ of the band pass filter. The system controller may include a wobble counter, a register responsive to the wobble counter, a microcontroller configured to output a first position estimate based on the generated wobble signal and to detect an initial state of the optical disc or a jump in tracking of the optical disc and generate a jump control signal, a firmware control unit configured to provide a second position estimate responsive to the jump control signal from the microcontroller, a multiplexer responsive to the microcontroller for selecting between the first position estimate of the microcontroller and the second position estimate of the firmware control unit and a digital to analog converter coupled to the output of the multiplexer to convert the selected position estimate to generate the frequency control signal. The second position estimate and the first position estimate may be values corresponding to a frequency of the wobble signal associated with the respective position estimates.

In additional embodiments of the present invention, the system controller is configured to provide a first mode of operation where the frequency control signal is generated based on a position of a pick-up apparatus of the optical storage device and a second mode of operation where the frequency control signal is generated based on the generated wobble signal.

Some embodiments of the present invention provide for generating a wobble signal for an optical storage device by adjusting a center frequency ($\omega_0$) of a band pass filter based on an estimated position of an optical pick-up apparatus of the optical storage device and filtering an input signal corresponding to the wobble signal with the adjusted band pass filter to provide the wobble signal.

Additional embodiments of the present invention include measuring a phase change in the band pass filter and adjusting $\omega_0$ of the band pass filter to reduce the measured phase change. Furthermore, the band pass filter may be a transconductance-capacitance (Gm-C) filter and adjusting a center frequency may include adjusting the transconductance of the transconductance-capacitance filter based on the control signal and the measured phase change to adjust $\omega_0$ of the band pass filter.

In still further embodiments of the present invention, in a first mode of operation the center frequency is adjusted based on a position of a pick-up apparatus of the optical storage device. In a second mode the center frequency is adjusted based on the generated wobble signal.

Optical storage devices incorporating methods and/or systems according to embodiments of the present invention are also provided.

DETAILED DESCRIPTION OF THE INVENTION

Figure 1:
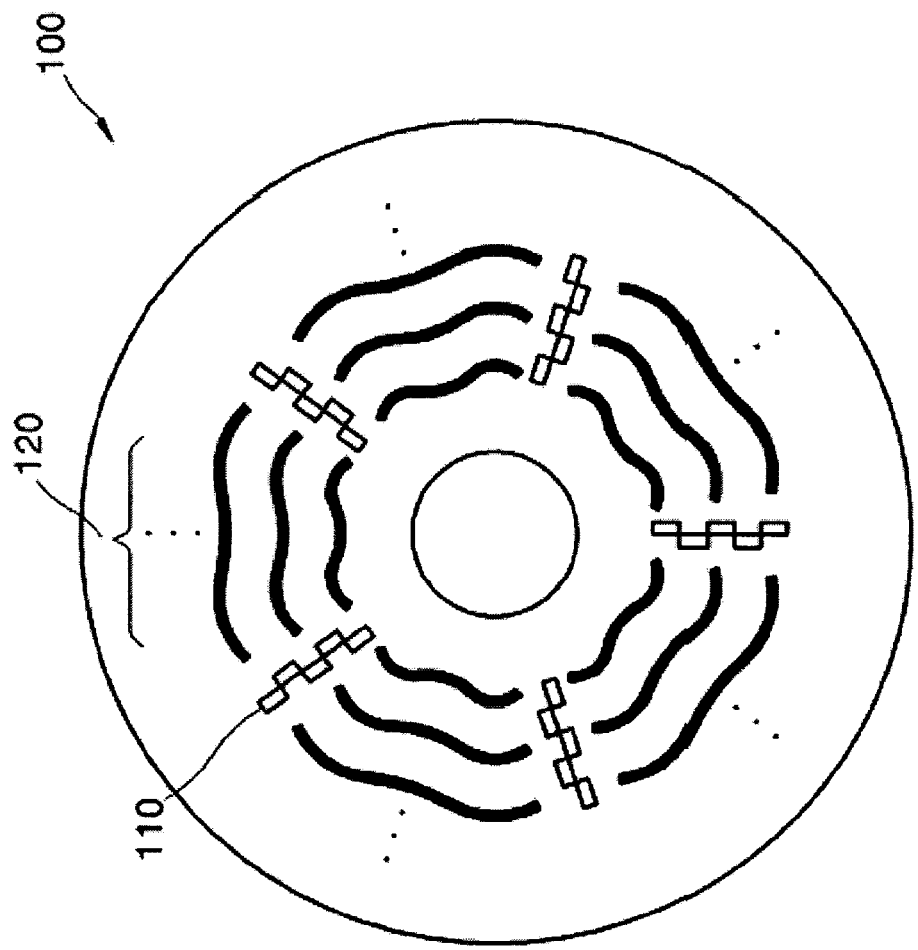
FIG. 1 is diagram of an optical storage disc.
Figure 2:
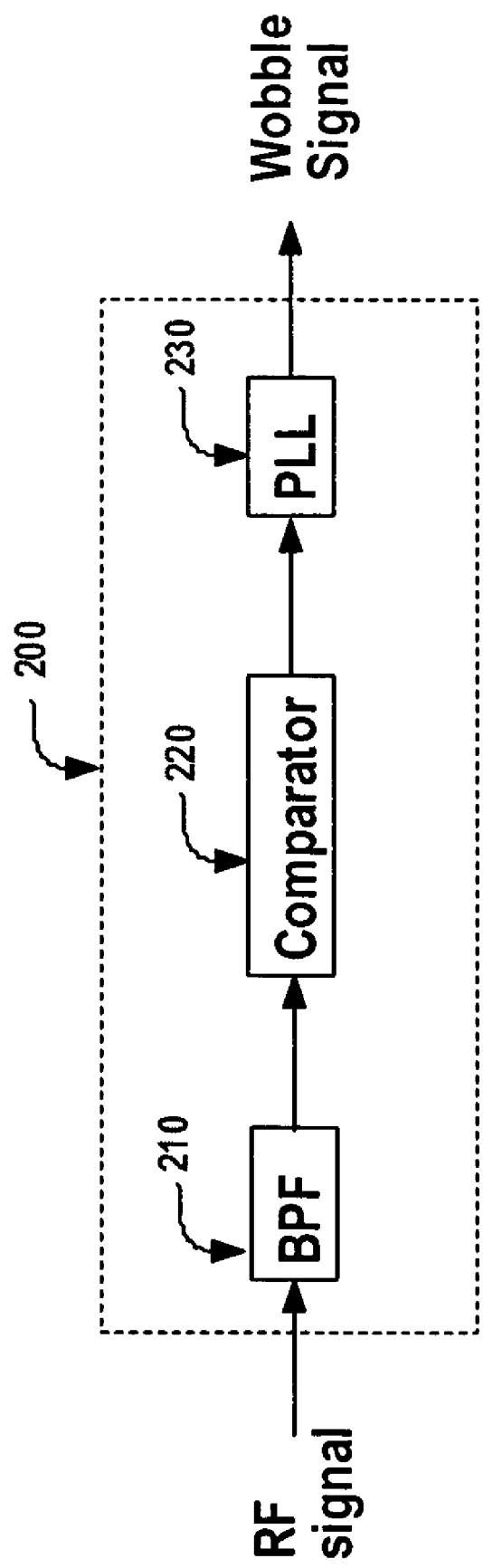
FIG. 2 is a block diagram of a conventional wobble detection circuit.

The present invention will now be described more fully with reference to the accompanying drawings, in which embodiments of the invention are shown. This invention may, however, be embodied in different forms and should not be construed as being limited to the embodiments set forth herein. Rather, these embodiments are provided so that this disclosure will be thorough and complete, and will fully convey the scope of the invention to those skilled in the art. In the drawings, the size or thickness of layers and regions are exaggerated for clarity. Like numbers refer to like elements. As used herein the term "and/or" includes any and all combinations of one or more of the associated listed items and may be abbreviated as "/".

It will be understood that, although the terms first and second may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, region, layer, or section discussed below could be termed a second element, region, layer, or section, and similarly without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, if a particular logic polarity is used herein to describe embodiments of the present invention, the opposite polarity may also be utilized for the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
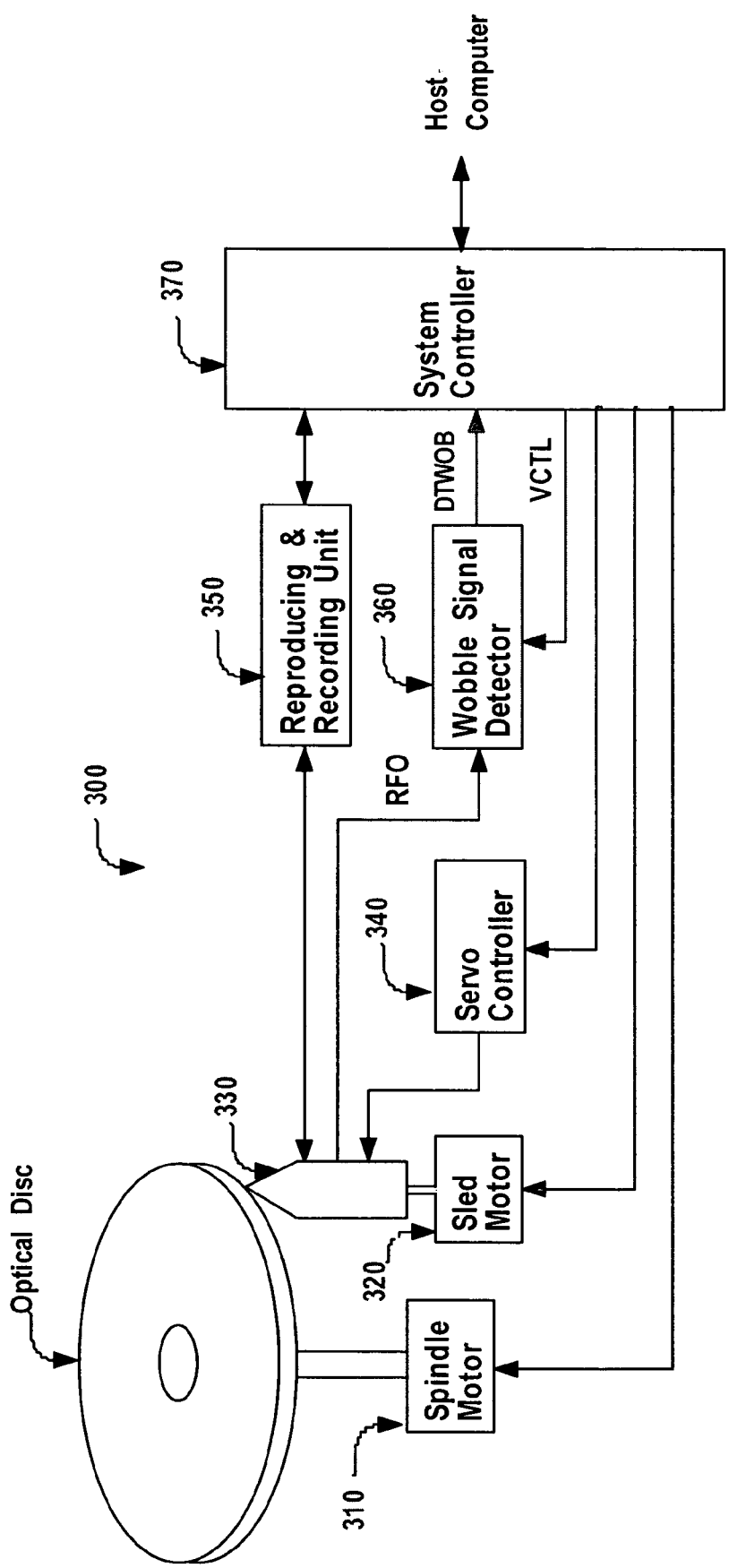
FIG. 3 is a block diagram of an optical storage device according to some embodiments of the present invention.

FIG. 3 illustrates an optical disc reproducing/recording system 300 having a wobble signal detector according to some embodiments of the present invention. The optical disc reproducing/recording system 300 may include a spindle motor 310, a sled motor 320, an optical pick-up apparatus 330, a servo controller 340, a reproducing/recording unit 350, a wobble signal detector 360 and a system controller 370.

The spindle motor 310 rotates the optical disc responsive to the controller 370. In some embodiments, the spindle motor 310 rotates the optical disc at a constant angular velocity. The sled motor 320 operates to move the relative position of the pick-up unit 330 with respect to the optical disc. The servo controller 340 controls the operation of the pick-up unit 330 responsive to the controller 370. The servo controller 340 drives a tracking actuator and a focusing actuator included in the pick-up unit 330. The pick-up unit 330 generates (reads) an output signal RFO based on the wobble information on the optical disc that is provided to the wobble signal detector 360.

The pick-up unit 330 may also generate other signals from information recorded on an optical disc that are provided, for example, to the reproducing and recording unit 350, which may perform encoding and/or decoding. The pick-up unit 330 also may record (write) encoded data in an optical disc. The operation of the spindle motor 310, sled motor 320, pick-up unit 330, servo controller 340 and reproducing and recording unit 350 may be as provided in a conventional optical storage device and, thus, these components may be conventional components.

As is further illustrated in FIG. 3, the wobble signal detector 360 according to some embodiments of the present invention generates the wobble signal DTWOB after processing the input signal RFO using a reference frequency control voltage VCTL provided by the system controller 370. The reference frequency control voltage VCTL may be a voltage corresponding to an expected frequency of the wobble signal DTWOB and/or a position of the pick-up apparatus 330. Thus, in some embodiments of the present invention, the system controller 370, as described herein, may provide means for estimating an initial position of an optical pick-up apparatus and means for determining an expected frequency based on the estimated initial position of the optical pick-up apparatus. The wobble signal detector 360 is configured to adjust a center frequency ($\omega_0$) of a band pass filter of the wobble signal detector 360 responsive to the reference frequency control voltage VCTL. The wobble signal detector 360 receives the input signal RFO corresponding to the wobble signal read from the optical disc and band pass filters the input signal RFO utilizing the adjusted center frequency to provide an output wobble signal DTWOB.

As discussed above, the wobble signal detector 360 generates the wobble signal DTWOB after processing the input signal RFO. The system controller 370 may control the optical disc tracking using the wobble signal DTWOB and the input/output signal of the reproducing/recording unit 350 and may provide an interface to a host computer. For example, the system controller 370 may control the optical disc tracking and traces the exact disc position using the wobble signal DTWOB. The system controller 370 also may control the overall system using a tracking error signal and a mirror signal extracted from the input signal RFO.

Figure 4:
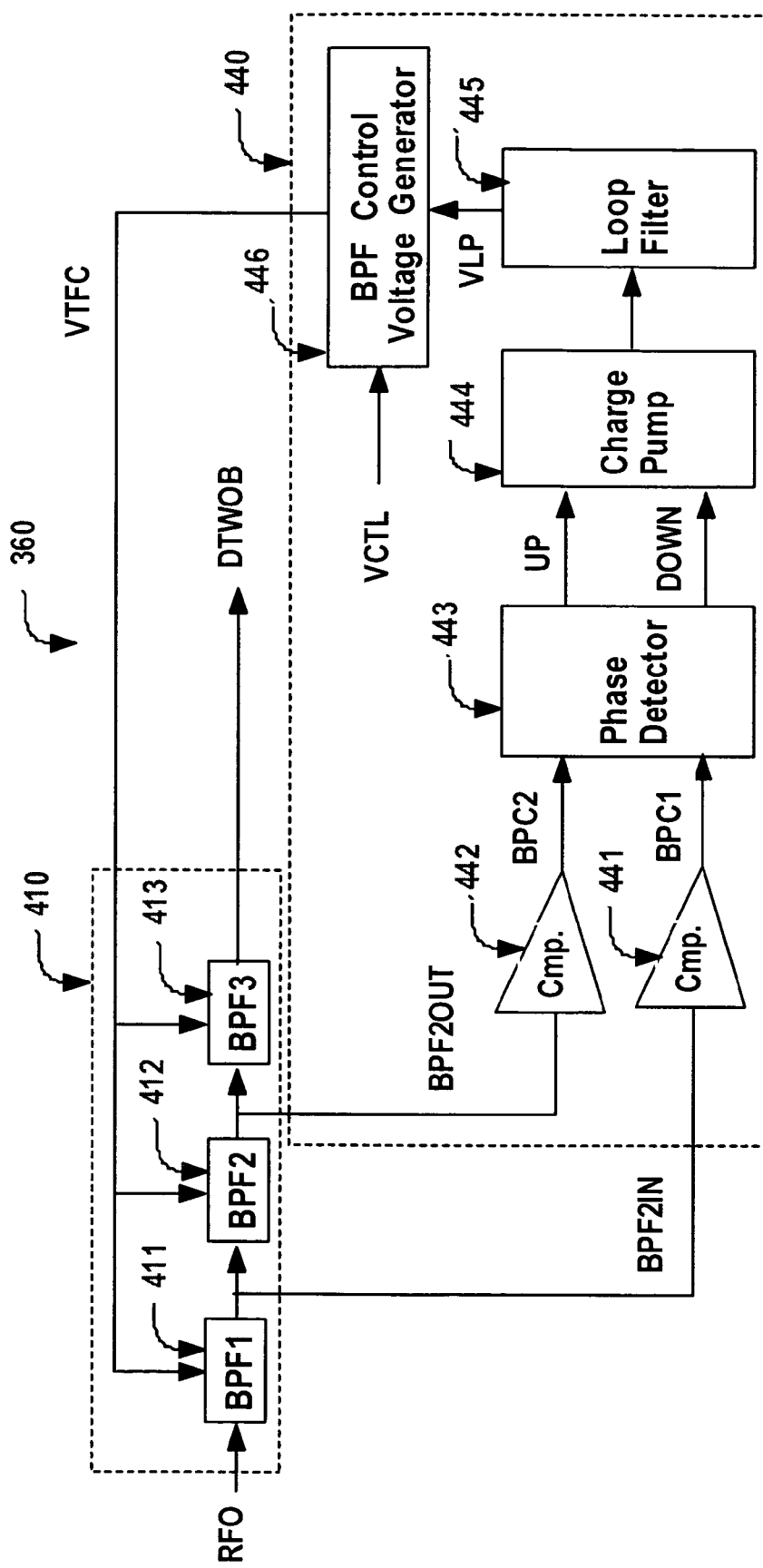
FIG. 4 is a block diagram of a wobble signal detector according to some embodiments of the present invention.

FIG. 4 illustrates a wobble signal detector 360 according to certain embodiments of the present invention. The wobble signal detector 360 includes a band pass filter 410 and a frequency calibration control unit 440. In some embodiments of the present invention, the frequency calibration control unit 440, alone or in combination with the system controller 370, provides means for adjusting the center frequency ($\omega_0$) of the band pass filter 410 based on an expected frequency of the wobble signal. The frequency calibration control unit 440 may also provide means for adjusting the center frequency based on a measured phase change of the band pass filter. The band pass filter 410 may generate the wobble signal DTWOB by filtering the input signal RFO input from the optical disc pick-up apparatus 330 using the target frequency control voltage VTFC to adjust the center frequency $\omega_0$ of the band pass filter 410. The frequency control unit 440 may generate the target frequency calibration voltage VTFC using a phase difference between an input and an output of a band pass filter.

As seen in FIG. 4, the band pass filter 410 may be provided as a sixth order filter by serially connecting second order band pass filters. Thus, the band pass filter 410 may include a first second order BPF 411, a second second order BPF 412 and a third second order BPF 413 connected serially. The center frequency $\omega_0$ of each of the BPFs 411-413 is adjusted according to the target frequency control voltage VTFC to generate the wobble signal DTWOB at the BPF 410 output.

The frequency calibration control unit 440 includes comparator circuits 441 and 442 that compare the input signal BPF2IN to the second BPF 412 and the output signal BPF2OUT of the second BPF 412 to a reference voltage. The reference voltage may be set to ½ the operating voltage of the wobble detector circuit 360. In some embodiments of the present invention, the reference voltage is ½VDD. Thus, the first comparator 441 and the second comparator 442 convert an input signal BPF2IN and an output signal BPF2OUT of the second BPF 412, respectively, into digital signal level signals. The first comparator 441 and the second comparator 442 compare the signals to the reference voltage and output a first logic state (logic low state or logic high state) if the input signal is equal to or less than the reference voltage and to a second logic state (the other of a logic high state or logic low state) if the input value is greater than the reference value. The output signals BPC1 and BPC2 from the comparators 441 and 442 are provided to a phase detector 443.

The phase detector 443 compares the phase of the two signals and outputs either an UP signal or a DOWN signal depending on whether the output BPF2OUT of the BPF 412 is leading or lagging the input BPF2IN of the BPF 412. In particular, if the phase of the first comparator 441 leads the output of the second comparator 442, the push-up signal UP is activated and, in the contrary case, the pull-down signal DOWN is activated. The UP and DOWN signals from the phase detector 443 are provided to a charge pump 444, which generates an output signal based on the UP and DOWN signals and outputs the generated output signal to the loop filter 445.

The loop filter 445 low pass filters the output of the charge pump 444 and provides a filtered output corresponding to a detected phase change of the band pass filter to provide the phase change control voltage VLP to the BPF control voltage generator 446 as a voltage corresponding to the detected phase difference. The BPF control voltage generator 446 combines the reference frequency control voltage VCTL that corresponds to an expected center frequency provided by the controller 370 and the phase change voltage VLP corresponding to the detected phase change of the band pass filter 410 to provide the target frequency control voltage VTFC to the band pass filter 410.

Thus, the frequency calibration control unit 440 as described above and with reference to FIG. 7 below alone or in combination with the system controller 370, may provide means for adjusting a transconductance of a transconductance-capacitance band pass filter based on the expected frequency of the wobble signal and the measured phase change of the band pass filter. In particular the frequency calibration control unit 440 may provide means for combining a reference frequency control signal corresponding to an expected frequency of the wobble signal and a phase change signal corresponding to a detected phase change of the band pass filter and alone or in combination with the band pass filter 410 may provide means for adjusting the center frequency based on the combination of the reference frequency control signal and the phase change signal.

Figure 5:
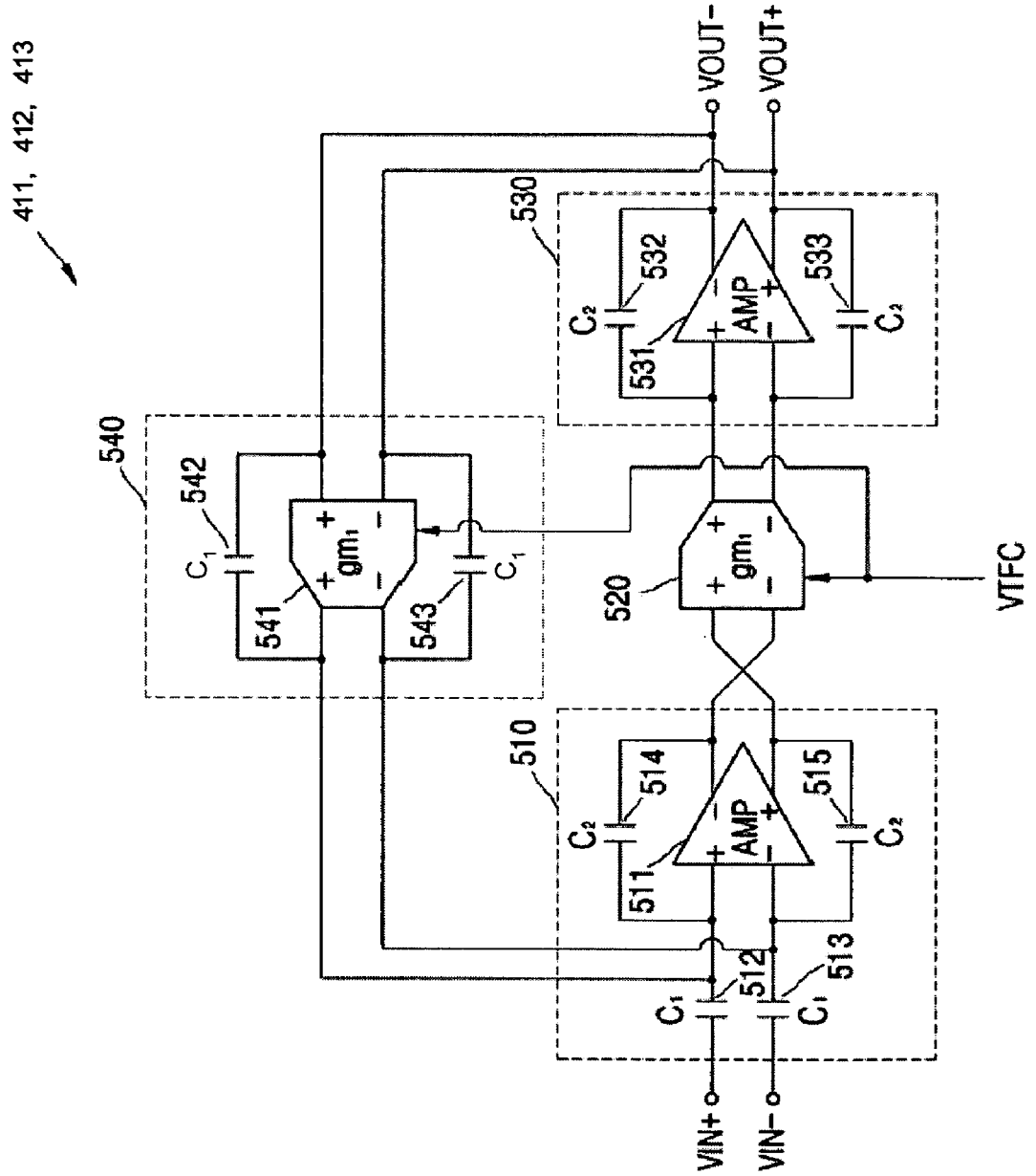
FIG. 5 is a circuit diagram of a band pass filter according to some embodiments of the present invention.

FIG. 5 illustrates band pass filters 411-413 according to some embodiments of the present invention. While the band pass filters 411-413 are illustrated as being substantially identical, different filters could also be used. However, in some embodiments of the present invention, each of the respective band pass filters 411-413 include a first amplifier 510, a second amplifier 520, a third amplifier 530 and a fourth amplifier 540. The first amplifier 510 includes an operational amplifier 511, first input capacitors 512 and 513 and feedback capacitors 514 and 515. The values of the capacitances $C_1$ and $C_2$ may depend on the particular technology implementation of the band pass filter 411, 412 and 413 and the characteristics of the particular wobble signal to be generated. In particular embodiments of the present invention, $C_1$ is 0.5 pf and $C_2$ is 2.0 pf. The amplifier 510 amplifies a summation signal of both the differential input signal (VIN+)−(VIN−) and the feedback signal of the fourth amplifier 540. The differential input signal (VIN+)−(VIN−) corresponds to the input signal RFO, the output signal of the first BPF 411 or the output signal of the second BPF 412.

The second amplifier 520 is shown as a transconductance amplifier that generates a first current (the input voltage*self transconductance). In particular, the first current is the output voltage of the first amplifier 510 multiplied by $gm_1$. The value of $gm_1$ is controlled by the target frequency control voltage VTFC.

The third amplifier 530 includes an operational amplifier 531 and feedback capacitances 532 and 533. The third amplifier amplifies the output signal of the second amplifier 520 and generates the differential output signal (VOUT+)−(VOUT−).

The fourth amplifier 540 includes a transconductance amplifier 541 and feedback capacitors 542 and 543. The fourth amplifier 540 amplifies the output signal of the third amplifier 530 and generates a second current. In particular, the second current is the output voltage of the third amplifier 530 multiplied by $gm_1$. The second current is transferred into the input of the first amplifier 510. The value of $gm_1$ is controlled by the target frequency control voltage VTFC.

Equation 1 is the Laplace Transfer Function for the second order filter of FIG. 5.

$$\frac{VOUT}{VIN} = \frac{\frac{C_1 gm_1}{C_2^2} S}{S^2 + \frac{C_1 gm_1}{C_2^2} S + \frac{gm_1^2}{C_2^2}} = \frac{KS}{S^2 + \frac{\omega_0}{Q} S + \omega_0^2} \quad (1)$$

In equation 1, VIN is the input voltage, VOUT is the output voltage, $C_1$ and $C_2$ are the capacitances in FIG. 5, $\omega_0 = gm_1/C_2$ is the center frequency of the filter, i.e., the peak gain of the filter that is set to the target frequency of the wobble signal DTWOB, $Q = C_2/C_1$ and $K = \omega_0/Q$. Thus, $C_1$ and $C_2$ may be selected to provide the desired bandwidth and center frequency ranges for the particular range of frequencies of the wobble signal. For example, $C_2$ may be selected based on the range of values of $gm_1$ of the amplifiers 520 and 540 so as to provide center frequencies in the range of expected wobble frequencies. $C_1$ may be selected to provide the desired Q from the filter. The Q for the filter may be selected based on the ability to predict the wobble frequency. For example, if Q is set to make the bandwidth of the filter too narrow, then the actual wobble frequency may be outside the pass band of the filter, which may make it difficult to lock on the wobble frequency. In particular embodiments of the present invention, gm1 may be variable from 10.3 µA/V to 185 µA/V with a control voltage variation of from 0.85 V to 2.45 V. Likewise, the operational amplifiers may have an open loop gain of greater than 40 db.

Figure 6B:
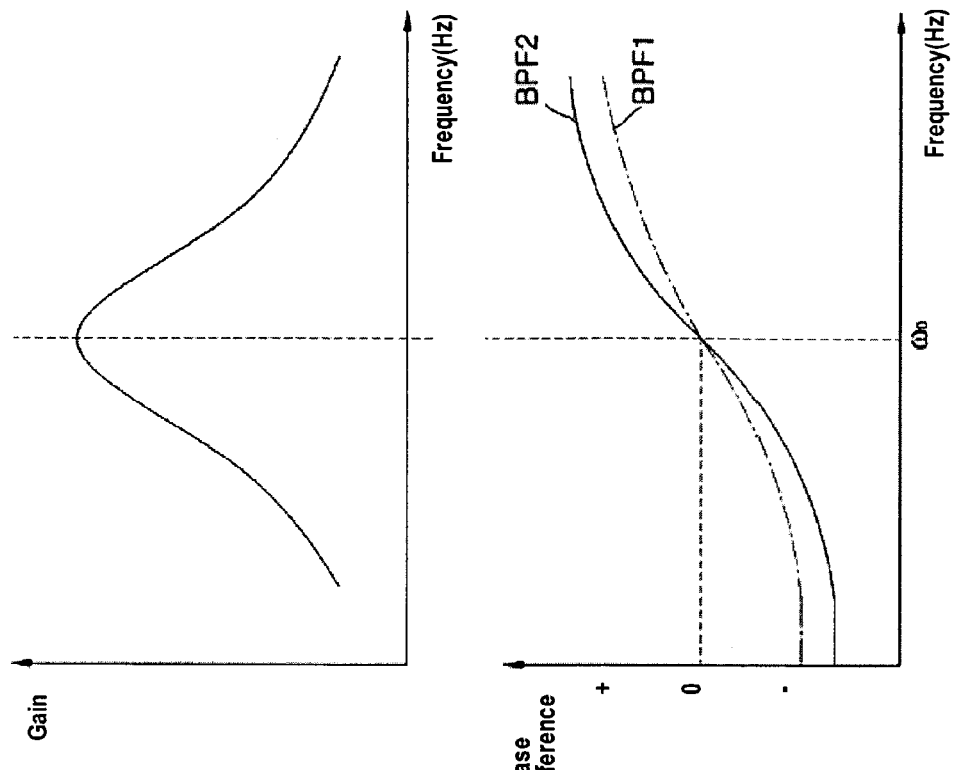
FIGS. 6A and 6B are graphs of gain and phase difference versus frequency of band pass filters according to some embodiments of the present invention.
Figure 6A:
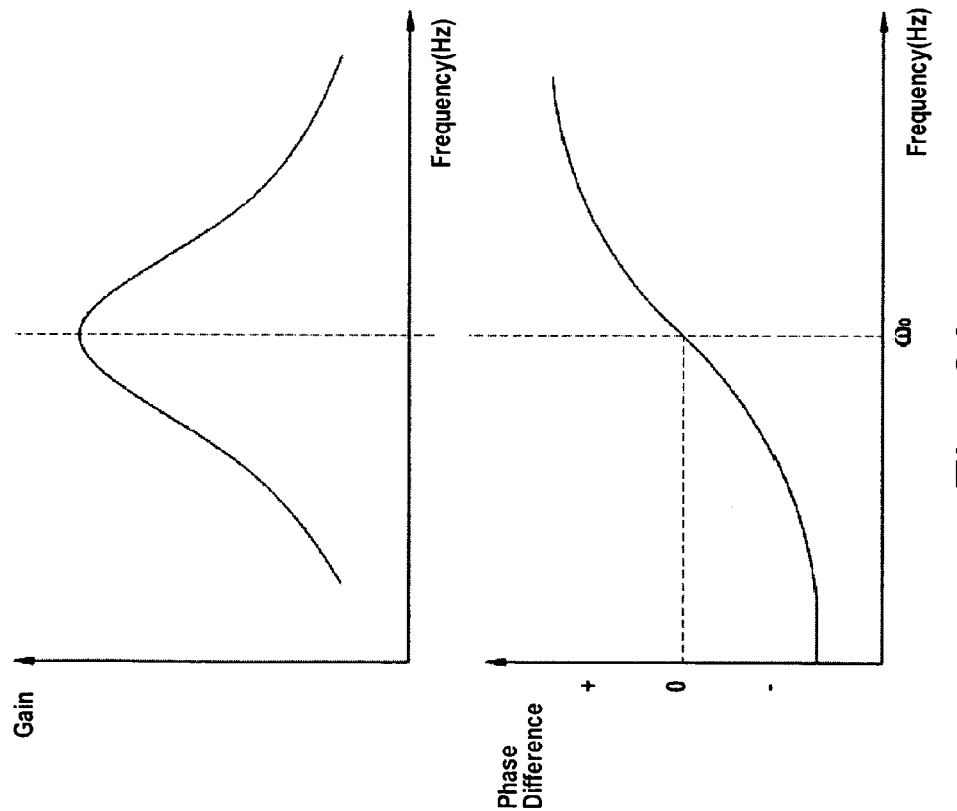

FIGS. 6A and 6B illustrate gain and phase difference characteristic graphs for the second order filter in FIG. 5. That is, FIGS. 6A and 6B show the peak gain at the target frequency occurs where the phase difference between an input and an output are zero. Furthermore, FIG. 6B illustrates that a phase difference between the input and the output of the second BPF 412 is also centered around the peak gain. Furthermore, FIG. 6B shows that the phase difference of both the first BPF 411 and the second BPF 412 is the same when $\omega=\omega_0$. When $\omega>\omega_0$, the phase of the second BPF 412 leads the phase of the first BPF 411. When $\omega<\omega_0$, the phase of the second BPF 412 lags the phase of the first BPF 411.

Using the second order BPF of FIG. 5, the center frequency $\omega_0$ of the band pass filter changes according to $gm_1$ to correspond to the target frequency of the wobble signal. Thus, the transconductance ($gm_1$) at the second amplifier 520 and the fourth amplifier 540 in FIG. 5 is changed (calibrated) so that the output of the second order BPFs 411-413 are centered around the actual frequency of the wobble signal.

As discussed above, the frequency calibration control unit 440 in FIG. 4 calculates a target frequency control voltage VTFC according to the phase difference between the input signal BPF2IN and the output signal BPF2OUT of the second BPF 412. The frequency calibration control unit 440 changes the self transconductance ($gm_1$) in the second amplifier 520 and the fourth amplifier 540 by adjusting the target frequency control voltage VTFC. The wobble signal detector 360 calibrates the second order BPFs 411-413 so as to adjust the center frequency $\omega_0$ by varying the self transconductance ($gm_1$) so that the center frequency matches a target frequency of the wobble signal.

As discussed above, the frequency calibration control unit 440 according to some embodiments of the present invention includes a first comparator 441, a second comparator 442, a phase detector 443, a charge pump 444, a loop filter 445 and a BPF control voltage generator 446. The detailed operation for the charge pump 444, the loop filter 445 and the BPF control voltage generator 446 according to some embodiments of the present invention will now be described with reference to FIG. 7.

Figure 7:
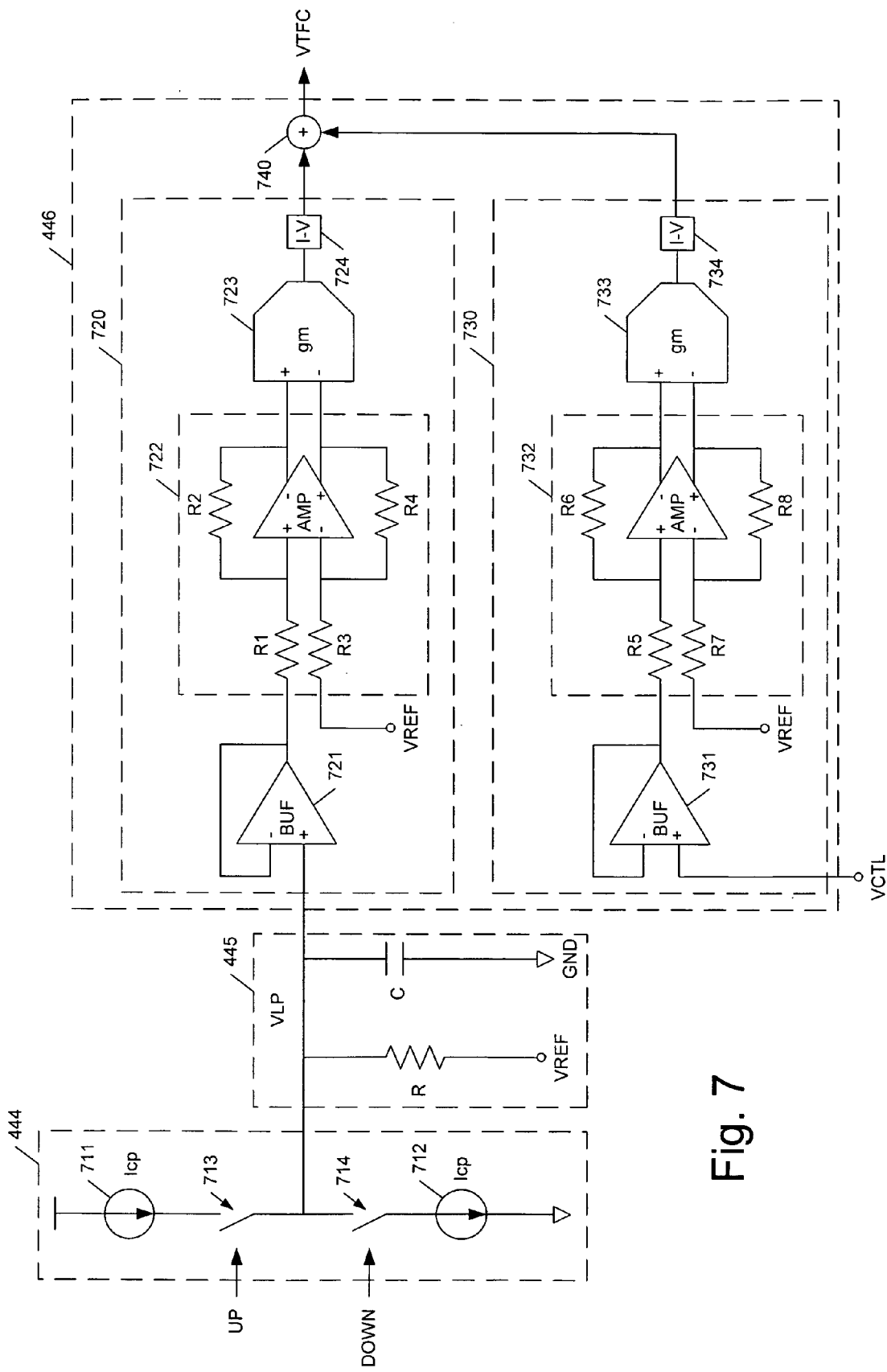
FIG. 7 is a circuit diagram of a charge pump, a loop filter and a BPF control voltage generator according to some embodiments of the present invention.

As shown for the embodiments of FIG. 7, the charge pump 444 includes a first current source 711, a second current source 712, a first switch 713 and a second switch 714. A current is generated according to the outputs UP, DOWN of the phase detector 443. When the UP signal is active, the first switch 713 closes and the first current source 711 sources current to the loop filter 445. When the DOWN signal is active, the second switch 714 closes and the second current source 712 sinks current from the loop filter 445.

The loop filter 445, which acts as a low pass filter, includes a resistance R and a capacitance C, and generates a voltage VLP proportional to the output current of the charge pump 444. The resistance R is connected to the reference voltage VREF so as to decrease the response time of the loop filter to changes in the output current of the charge pump 444. The reference voltage VREF may be the same as the reference voltage discussed above. The bandwidth of the loop filter 445 is determined by $1/(2\pi RC)$. For example, the resistance R and capacitance C value may be established so as to have sufficient bandwidth to accommodate the operation speed for the optical disc system (ex, DVD+R/RW). In particular embodiments of the present invention, R is a variable resistance that varies from 10 kΩ to 160 kΩ based on the bandwidth and C is an external 1 nf capacitor. The resistance R may be controlled based on disc speed, for example, based on a register value of the MICOM (830 of FIG. 8) such as register cp_fc<2:0> which is set by the MICOM (830 of FIG. 8) based on the disc speed.

The BPF control voltage generator 446 includes a first control voltage generator 720, a second control voltage generator 730 and a summer 740. The control voltage generator 446 generates the target frequency control voltage VTFC by using the reference frequency control voltage VCTL and the loop filter output voltage VLP. The reference frequency control voltage VCTL may be generated by the system controller 370 as discussed below with reference to FIG. 8.

The first control voltage generator 720 includes an operational amplifier buffer 721, a gain amplifier 722, a differential transconductance amplifier 723 and a current to voltage (I-V) converter 724. The buffer 721 buffers the output VLP of the loop filter 445. The gain amplifier 722 amplifies the output of the buffer amplifier 721 using an operational amplifier AMP, resistances R1-R4 and the reference voltage VREF. The differential output of the gain amplifier 722 is a voltage proportional to the output of the loop filter in comparison to the reference voltage VREF. The values of R1-R4 may be selected to provide the desired gain for the circuit so as to provide the appropriate input level to the differential transconductance amplifier 723. In particular embodiments of the present invention, the gain amplifier 722 and the buffer amplifier 721 have an open loop gain of at least 40 db and the resistances R1-R4 are each 10 kΩ. The differential transconductance amplifier 723 may have the same structure as the transconductance amplifiers included in the second order BPFs 411-413, such as the second amplifier 520 and the fourth amplifier 540. In particular embodiments of the present invention, the differential transconductance amplifier 723 has self transconductance of from 5.15 μA/V to 92.5 μA/V. The Gm values of the differential transconductance amplifiers 723 and 733 may be determined by the input voltage such that the output voltage of the amplifiers 722, 732 controls the Gm values. A current proportional to the voltage output of the gain amplifier 722 and the self transconductance (gm) is generated by the transconductance amplifier 723 and converted to a voltage by the current to voltage converter 724 to provide a first control voltage.

The second control voltage generator 730, like the first control voltage generator 720, includes an operational amplifier buffer 731, a gain amplifier 732, a differential transconductance amplifier 733 and a current to voltage (I-V) converter 734. The gain amplifier 732 may use the resistances R5-R8 to scale the output of the buffer 731. Otherwise, the second control voltage generator 730 operates substantially the same as the first control voltage generator 720 except that the reference frequency control voltage VCTL generated by the system controller 370 is provided as the input to the buffer 731. That is, the second control voltage generator 720 generates the second control voltage proportional to the reference frequency control voltage VCTL.

The output of the first control voltage generator 720 and the second control voltage generator 730 are provided to the summer 740, which generates the target frequency control voltage VTFC by summing both the first control voltage and the second control voltage. Because the frequency difference between the wobble signal may vary between the inside and outside of an optical disc, adjusting the frequency of the band pass filter 410 based only on phase difference may be impractical. For example, if the wobble frequency is too far from the center frequency of the band pass filter 410, the band pass filter 410 may take an unacceptably long time to lock on the wobble signal or may not lock at all. This may occur, for example, during initial optical disc tracking or when the optical pick-up 330 jumps from one track to another.

To assist the wobble signal detector 360 in locking onto the wobble signal, the second control voltage generator 730 uses the reference frequency control voltage VCTL from the controller 370 that is proportional to a target frequency of the wobble signal. By combining the VCTL signal and the phase control signal, difficulties in locking the center frequency $\omega_0$ to the wobble signal resulting from large deviations between the center frequency $\omega_0$ and the wobble frequency may be overcome. For example, the frequency of the wobble signal in some embodiments can be 10% out of range from the center frequency $\omega_0$. This deviation may be beyond the operational range of the comparators 411, 412 and the phase detector 443. The second control voltage generator 730 may be used so as to keep the center frequency $\omega_0$ of the band pass filter 410, for example, from being more than ±10% from the frequency of the wobble signal.

Figure 8:
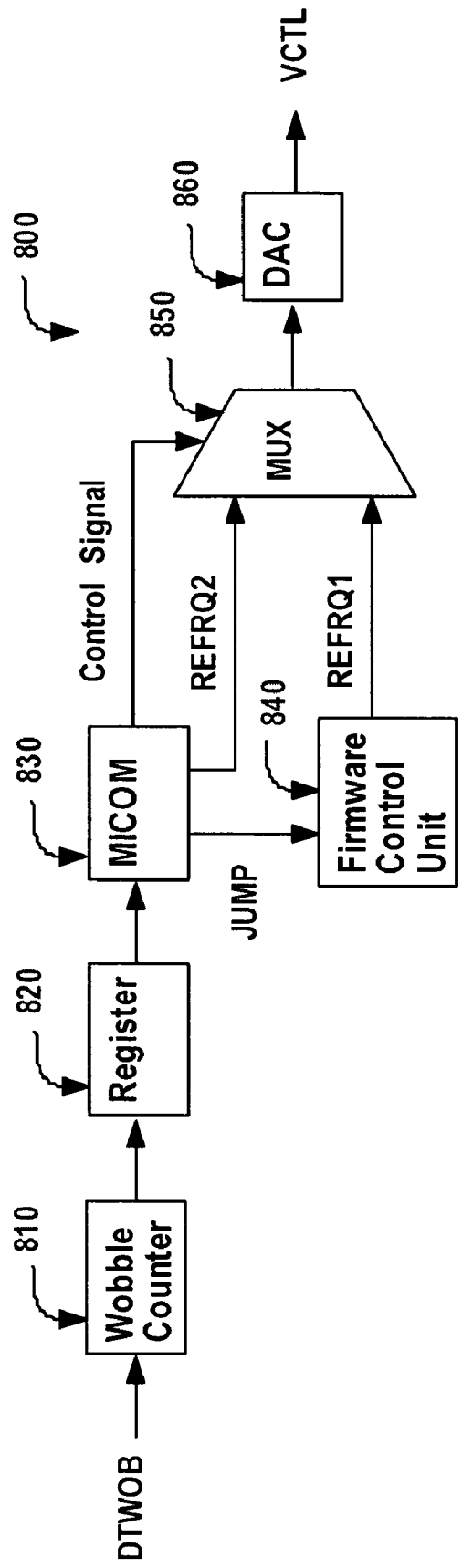
FIG. 8 is a block diagram of a target frequency control voltage generation circuit according to some embodiments of the present invention.

The reference frequency control voltage VCTL is an analog voltage output set based on an expected frequency of the wobble signal DTWOB and may be based on optical disc tracking status or track position. FIG. 8 is a block diagram illustrating a reference frequency control voltage generator 800 that generates the reference frequency control voltage VCTL. The reference frequency control voltage generator 800 may be provided as part of the system controller 370.

For the embodiments of FIG. 8, the reference frequency control voltage generator 800 includes a wobble counter 810, a register 820, a micro-controller (MICOM) 830, a firmware control unit 840, a multiplexer (MUX) 850 and a digital-analog converter (DAC) 860. The wobble counter 810 receives the wobble signal DTWOB, counts pulses of the wobble signal DTWOB and generates data corresponding to the count that reflects the frequency of the detected wobble signal DTWOB, which data is stored in the register 820. In some embodiments of the present invention, the register 820 is a partial result maximum likelihood (PRML) register. From the register value 820 the MICOM 830 may determine the frequency of the wobble signal DTWOB and/or the position of the pick-up apparatus 330 and may generate the control signal REFFRQ2.

In operation, the reference frequency control voltage generator 800 provides two modes of operation. In a first mode, where a large deviation of the wobble signal DTWOB frequency from the center frequency of the band pass filter 410 is detected or is expected, VCTL is generated based on the position of the optical pick-up apparatus 330. In a second mode of operation, where a large deviation of the wobble signal DTWOB frequency from the center frequency of the band pass filter 410 is not detected or expected, VCTL is generated based on the detected wobble signal DTWOB.

In the first mode of operation, during an initial optical disc tracking phase or when a tracking jump occurs, if the detected wobble signal DTWOB frequency has a large error with respect to the center frequency of the band pass filter 410 (e.g. $\omega_0 \pm 10\%$), the MICOM 830 generates a control signal JUMP and a control signal to control the MUX 850 to select the output of the firmware control unit 840. Responsive to receipt of the JUMP signal, the firmware control unit 840 outputs a register value REFREQ1 that may be set in advance according to reference frequencies. In particular, the firmware control unit 840 may include a number of registers having stored digital values corresponding to the reference frequencies of the wobble signal (i.e. the expected frequency of the wobble signal) based on a position of the optical pick-up apparatus 330, for example, an initial position or a jump track position. The output of the MUX 850 is provided to the DAC 860 that converts the register value to an analog voltage to provide the reference frequency control voltage VCTL.

The second mode of operation may be entered after locking the center frequency $\omega_0$ of the band pass filter 410 to the frequency of the wobble signal DTWOB. In the second mode of operation, the frequency determined from the register 820 is output to the MUX 850 by the MICOM 830 as REFREQ2.

For example, the MICOM 830 may include registers that store digital values for the tracking position, such as an inner or outer track in the optical disc to provide a CAV (constant angular velocity) mode of operation. As the tracking position moves from the inner sector to the outer sector, the frequency of the wobble signal DTWOB increases. Thus, the digital value corresponding to the outer sector is larger than the value corresponding to the inner sector in the optical disc. This digital value may be selected based on the value of the register 820 and output to the MUX. 850. Thus, in the second mode or steady-state mode of operation, the reference frequency control voltage VCTL is generated from the detected frequency of the wobble signal DTWOB. Accordingly, in some embodiments of the present invention, the system controller 370 and/or the reference frequency control voltage generator 800 may provide means for measuring the wobble signal and means for determining the expected frequency based on the measure wobble signal.

In a CLV (constant linear velocity) mode of operation, the frequency of the wobble signal does not vary with position of the pick-up apparatus 330. Thus, only an initial value need be provided by the MICOM 830 when the optical system operates at a low speed.

The control signal to the MUX 850 may be controlled by the MICOM to switch between the first mode of operation and the second mode of operation based on the detected wobble signal DTWOB and/or based on delay after the initial state has been exited or the JUMP signal activated. For example, the control signal may select the output of the firmware control unit 840 for a predetermined time after the JUMP signal is activated. This time could be set to correspond to the expected time for the wobble detector 360 to reach a steady state. Alternatively or additionally, the control signal may switch between selecting the output of the MICOM 830 and the firmware control unit 840 based on a determination that the center frequency of the band pass filter 410 is within a predetermined range of the frequency of the wobble signal. Thus, if the register value provided to the MUX 850 indicates a frequency that is within, for example, 10% of the wobble signal frequency the control signal could be set so that the MUX 850 selects the output of the MICOM 830. The MICOM 830 could also switch between selecting the output of the MICOM 830 and the firmware control unit 840 by determining if the deviation between successive adjustment values to the band pass filter are within a predetermined threshold.

Accordingly, in some embodiments of the present invention, the system controller 370 and/or the reference frequency control voltage generator 800 may provide means for determining the expected frequency based on an estimated position of an optical pick-up apparatus if the optical storage device is in an initial state, means for determining the expected frequency based on an estimated position of an optical pick-up apparatus responsive to a jump in tracking of the optical pick-up apparatus the optical storage device and means for determining the expected frequency based on a measured wobble signal if the expected frequency is not determined based on an estimated position of the optical pick-up apparatus. The system controller 370 and/or the reference frequency control voltage generator 800 may also provide means for determining if adjustments to the center frequency of the band pass filter have reached a steady state and means for switching from determining the expected frequency based on an estimated position of the optical pick-up apparatus to determining the expected frequency based on a measure of the wobble signal if the adjustments to the center frequency of the band pass filter have reached a steady state.

In particular embodiments of the present invention, the system controller 370 and/or the reference frequency control voltage generator 800 may provide means for waiting a predetermined time after the initial state of the optical storage device or after a jump in tracking of the optical pick-up apparatus and/or means for determining if a deviation in successive adjustment values to the band pass filter is within a predetermined threshold.

Figure 9A:
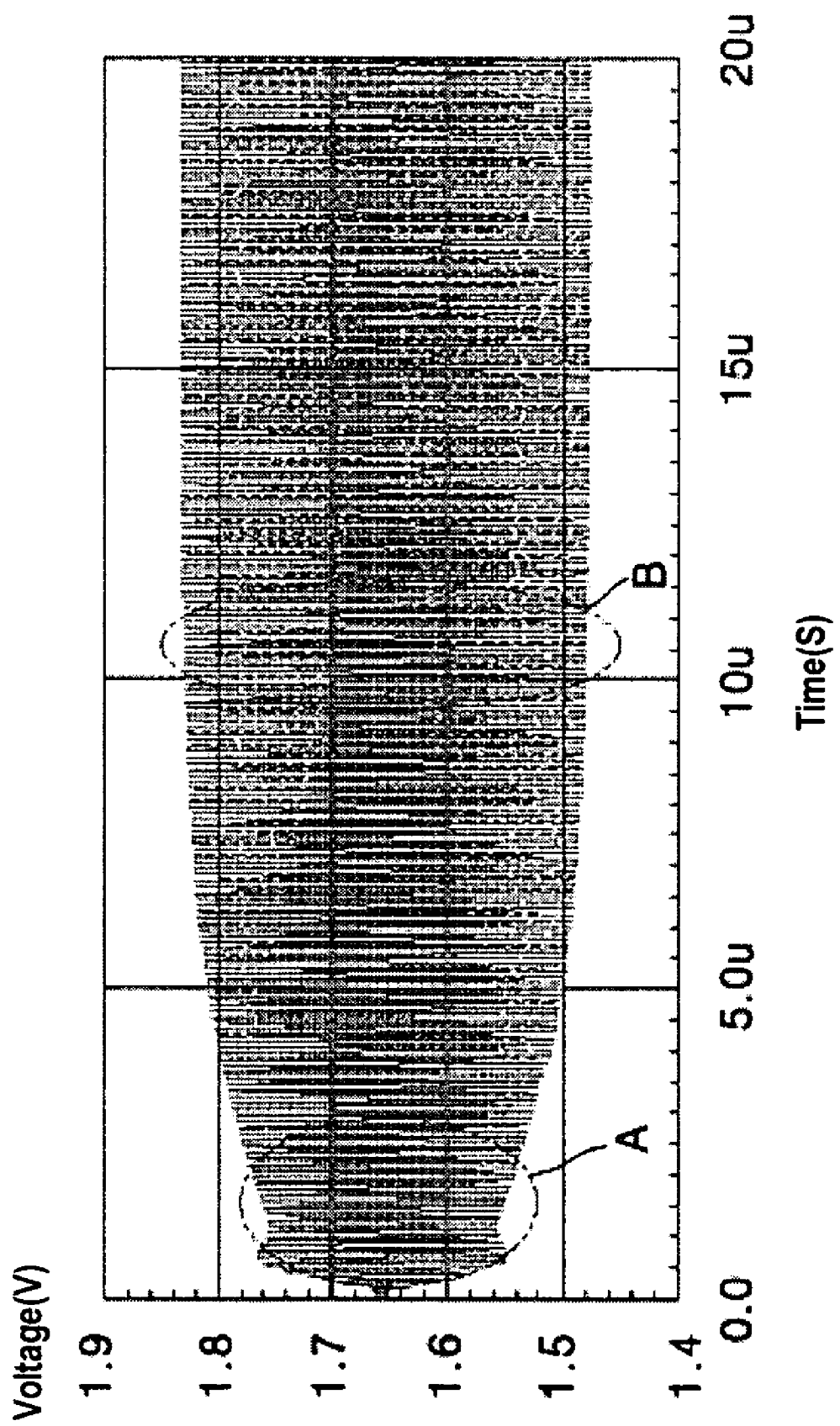
FIG. 9A is a simulation of a wobble signal.
Figure 9B:
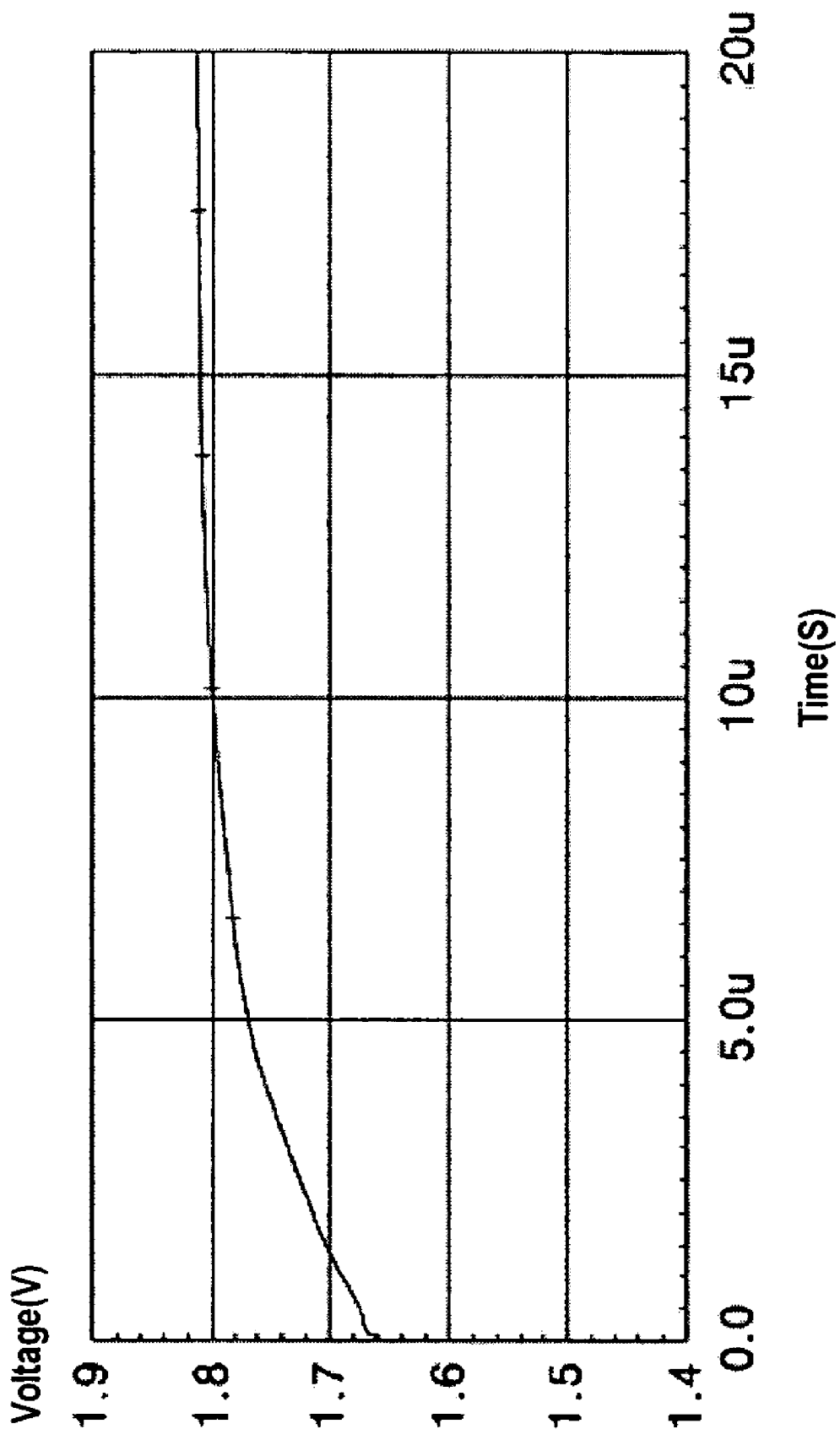
FIG. 9B is a simulation of the output voltage of a loop filter when the wobble signal changes from position A to position B of FIG. 9A.

FIG. 9A is a graph of simulation results illustrating the change of the center frequency of a band pass filter to match a wobble signal frequency. Position "A" in FIG. 9A illustrates a wobble signal DTWOB when the wobble signal differs greatly from the center frequency $\omega_0$ and position "B" illustrates when the center frequency $\omega_0$ has been adjusted to match the wobble frequency. FIG. 9B shows an output voltage VLP of the loop filter 445 when the wobble signal changes from position "A" to position "B" of FIG. 9A. As seen in FIG. 9A, the output voltage VLP of the loop filter 445 is gradually increased by the operation of the frequency calibration controller 440 when the wobble signal DTWOB has a large error in comparison with the center frequency $\omega_0$ and reaches a steady state when the wobble signal DTWOB no longer has a large error in comparison with the center frequency $\omega_0$.

Figure 10A:
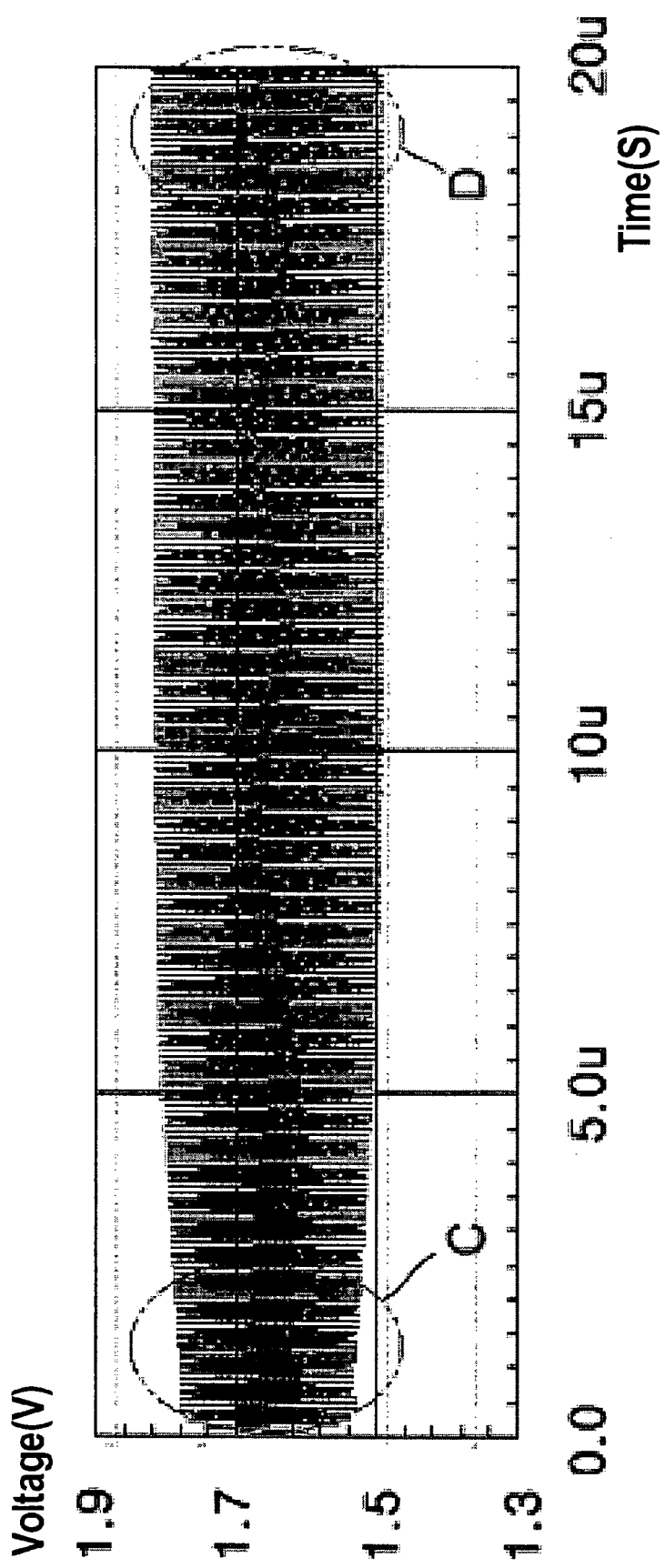
FIGS. 10A-10C are simulations of an input and output signal of a BPF according to some embodiments of the present invention.
Figure 10B:
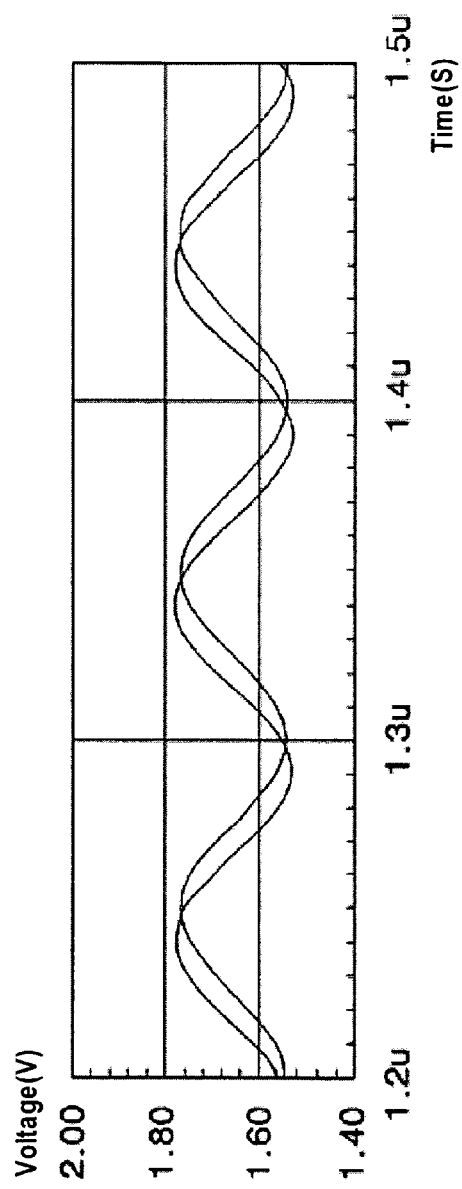
Figure 10C:
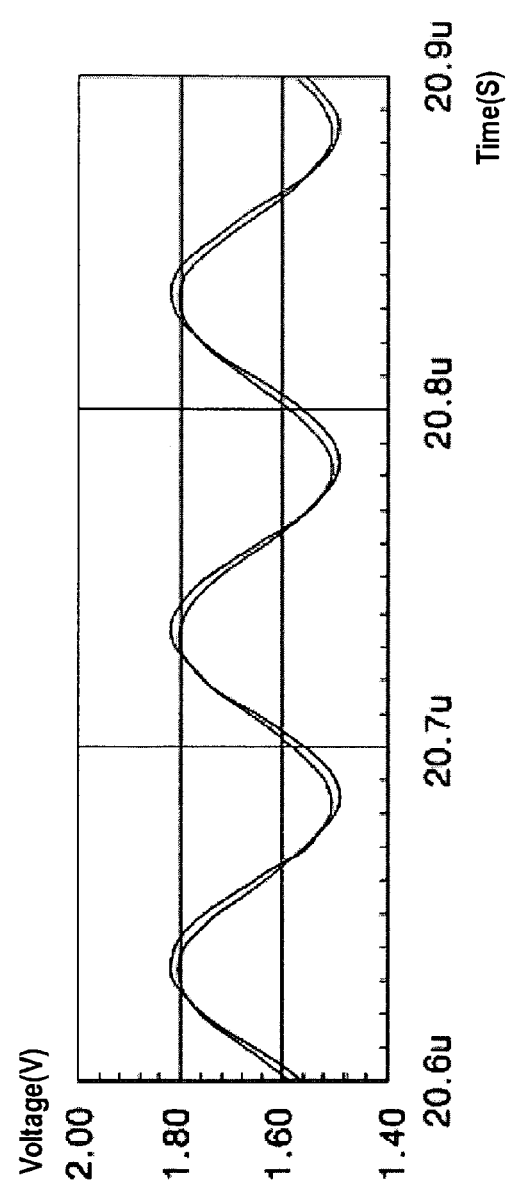

FIG. 10A is a simulation result illustrating the input/output signals BPF2IN, BPF2OUT of the second BPF 412 when an optical disc system is calibrating the center frequency according to some embodiments of the present invention. FIG. 10B and FIG. 10C illustrate an enlarged portion of FIG. 10A at the positions "C" and "D", respectively. As seen by comparing FIGS. 10B and 10C, the phase difference between the second BPF 412 input signal BPF2IN and the output signal BPF2OUT is decreased between positions "C" and "D".

While the present invention has been particularly shown and described with reference to particular embodiments thereof, it will be understood by those of ordinary skill in the art that various changes in form and details may be made therein without departing from the spirit and scope of the present invention as defined by the following claims.

What is claimed is:

1. A system for generating a wobble signal from an optical disc, comprising:
a system controller configured to generate a reference frequency control signal corresponding to an expected frequency of a wobble signal read from the optical disc; and
a wobble signal detection circuit configured to adjust a center frequency ($\omega_0$) of a band pass filter responsive to the reference frequency control signal and a phase change control signal corresponding to a detected phase change of the band pass filter, receive an input signal corresponding to the wobble signal read from the optical disc and band pass filter the input signal utilizing the adjusted center frequency to provide an output wobble signal; and
wherein the band pass filter comprises a plurality of serially connected band pass filters that respectively have an adjustable center frequency responsive to a target frequency control signal; and
wherein the target frequency control signal is generated by combining the reference frequency control signal and the phase change control signal.

2. The system of claim 1, wherein the wobble signal detection circuit is further configured to measure a phase change by the band pass filter and adjust the center frequency of the band pass filter to reduce the measured phase change.

3. The system of claim 2, wherein the band pass filter of the wobble signal detection circuit comprises a transconductance-capacitance (Gm-C) filter.

4. The system of claim 3, wherein the wobble signal detection circuit is further configured to adjust the transconductance of the transconductance-capacitance filter based on the reference frequency control signal and the measured phase change to adjust the center frequency of the band pass filter.

5. The system of claim 1, wherein the system controller is further configured to selectively generate the reference frequency control signal based on a measure of the frequency of the wobble signal or an initial position estimate of a pick-up apparatus of the optical storage device and independent of a measure of the wobble signal.

6. The system of claim 5, wherein the reference frequency control signal is generated from the initial position estimate during an initial state of operation or if a jump in position of the pick-up apparatus of the optical storage device is detected.

7. The system of claim 6, wherein the position estimate based on a measure of the frequency is based on a value of a partial response maximum likelihood (PRML) read register.

8. The system of claim 1, wherein the system controller comprises:
   a wobble counter;
   a register responsive to the wobble counter;
   a microcontroller configured to output a first expected frequency value based on the generated wobble signal and to detect an initial state of the optical disc or a jump in tracking of the optical disc and generate a jump control signal;
   a firmware control unit configured to provide a second expected frequency value responsive to the jump control signal from the microcontroller;
   a multiplexer responsive to the microcontroller for selecting between the first expected frequency value of the microcontroller and the second expected frequency value of the firmware control unit; and
   a digital to analog converter coupled to the output of the multiplexer to convert the selected expected frequency value to a voltage to generate the reference frequency control signal.

9. The system of claim 8, wherein the second expected frequency value and the first expected frequency value comprise values corresponding to a frequency of the wobble signal associated with an estimated position of a pick-up apparatus.

10. The system of claim 1, wherein the system controller is configured to provide a first mode of operation where the reference frequency control signal is generated based on a position of a pick-up apparatus of the optical storage device and a second mode of operation where the reference frequency control signal is generated based on the wobble signal.

11. A system for generating a wobble signal from an optical disc, comprising:
   a system controller configured to generate a reference frequency control voltage corresponding to an expected frequency of a wobble signal read from the optical disc; and
   a wobble signal detection circuit responsive to the reference frequency control voltage, said wobble signal detection circuit configured to receive an input signal corresponding to the wobble signal read from the optical disc and band pass filter the input signal to provide an output wobble signal, said wobble signal detection circuit comprising:
      a band pass filter having an adjustable center frequency ($\omega_0$) responsive to a target frequency control voltage, said band pass filter comprising a plurality of serially connected band pass filters, each having an adjustable center frequency responsive to the target frequency control voltage; and
      a frequency calibration control unit configured to combine the reference frequency control voltage and a phase change control voltage corresponding to a measured phase change of the band pass filter to provide the target frequency control voltage.

12. The system of claim 11, wherein the frequency calibration control unit comprises:
   a phase detection circuit coupled between an input and an output of at least one of the serially connected band pass filters;
   a charge pump responsive to the phase change detection circuit and configured to output a current based on the output of the phase detection circuit;
   a loop filter having an input coupled to the charge pump and an output corresponding to the filtered output of the charge pump; and
   a band pass filter control voltage generator configured to receive the output of the loop filter and the reference frequency control voltage and output the target frequency control voltage to each of the serially connected band pass filters.

13. The system of claim 12, wherein the frequency calibration control unit further comprises:
   a first comparator coupled between an output of the at least one of the serially connected band pass filters and the phase detection circuit configured to compare an output of the one of the serially connected band pass filters to a reference voltage and output a signal corresponding to a difference between the output of the one of the serially connected band pass filters and the reference voltage to the phase detection circuit; and
   a second comparator coupled between an input of the at least one of the serially connected band pass filters and the phase detection circuit configured to compare an input of the one of the serially connected band pass filters to the reference voltage and output a signal corresponding to the difference between the input of the one of the serially connected band pass filters and the reference voltage to the phase detection circuit.

14. The system of claim 12, wherein the loop filter comprises an RC filter including a resistance (R) coupled between an output of the charge pump and a reference voltage and a capacitance (C) coupled between the output of the charge pump and a ground voltage.

15. The system of claim 12, wherein the band pass filter control voltage generator comprises:
   a first band pass filter transconductance control circuit coupled to the output of the loop filter and configured to output a first voltage corresponding to the output of the loop filter;
   a second band pass filter transconductance control circuit having as an input the reference frequency control voltage and configured to output a second voltage corresponding to the reference frequency control voltage; and
   a voltage summing circuit configured to sum the first and second voltages to provide the target frequency control voltage.

16. The system of claim 15, wherein each of the first and second band pass filter transconductance control circuits comprise:

a buffer amplifier coupled to an input of the band pass filter transconductance control circuit;

an operational amplifier having a first input coupled to the reference voltage and a second input coupled to the output of the buffer amplifier; a transconductance amplifier coupled to the output of the operational amplifier; and a current to voltage converter coupled to the output of the transconductance amplifier to provide an output voltage of the band pass filter transconductance control circuit.

17. The system of claim 16, wherein a first output of the buffer amplifier is coupled to the operational amplifier through a first resistance, the reference voltage is coupled to the operational amplifier through a second resistance, a first output of the operational amplifier is coupled to a first input of the operational amplifier through a third resistance and a second output of the operational amplifier is coupled to a second input of the operational amplifier through a fourth resistance.

18. A method of generating a wobble signal for an optical storage device, comprising:

generating a wobble signal by filtering an input signal derived from information received from the optical storage device using a plurality of serially connected band pass filters that respectively have adjustable center frequencies; and adjusting the center frequencies of the plurality of serially connected band pass filters in response to a target frequency control signal generated by combining a reference frequency control signal corresponding to an expected frequency of the wobble signal and a phase change control signal corresponding to a detected phase change of the plurality of serially connected band pass filters; and filtering an input signal corresponding to the wobble signal with the adjusted band pass filter to provide the wobble signal.

19. The method of claim 18, wherein said adjusting the center frequencies is responsive to a measured phase change of the plurality of serially connected band pass filters.

20. The method of claim 19, further comprising:

determining if adjustments to the center frequencies have reached a steady state; and determining an expected frequency of the wobble signal in response to detecting that the center frequencies of the band pass filter have reached a steady state.

21. The method of claim 20, wherein determining if adjustments to the center frequencies have reached a steady state comprises waiting a predetermined time after the initial state of the optical storage device or after a jump in tracking of an optical pick-up apparatus.

22. The method of claim 20, wherein determining if adjustments to the center frequencies have reached a steady state comprises determining if a deviation in successive adjustment values to the pluralities of serially connected band pass filters is within a predetermined threshold.

23. The method of claim 19, wherein adjusting the center frequencies comprises adjusting a transconductance of a transconductance-capacitance band pass filter based on an expected frequency of the wobble signal and a measured phase change of the plurality of serially connected band pass filters.

24. The method of claim 18, further comprising:

estimating a position of an optical pick-up apparatus of the optical storage device; and determining an expected frequency of the wobble signal based on the estimated position of the optical pick-up apparatus.

25. The method of claim 24, wherein the estimated position is a position of the optical pick-up apparatus when the optical storage device is in an initial state.

26. The method of claim 24, wherein the estimated position is a position of the optical pick-up apparatus after a jump in tracking of the optical pick-up apparatus.

27. A wobble detection circuit for generating a wobble signal for an optical storage device, comprising:

a band pass filter having an adjustable center frequency ($\omega_0$) responsive to a target frequency control voltage; and a frequency calibration control unit configured to combine a reference frequency control voltage corresponding to an expected frequency of a wobble signal and a phase change control voltage corresponding to a detected phase change of the band pass filter to provide the target frequency control voltage;

wherein the band pass filter comprises a plurality of serially connected band pass filters, each having an adjustable center frequency responsive to the target frequency control voltage.

28. The wobble detection circuit of claim 27, wherein the plurality of serially connected band pass filters comprise a plurality of Gm-C filters and wherein the center frequency of a Gm-C filter of the Gm-C filters is adjusted by adjusting the self transconductance of a transconductance amplifier of the Gm-C filter.

29. A wobble detection circuit for generating a wobble signal for an optical storage device, comprising:

a band pass filter having an adjustable center frequency ($\omega_0$) responsive to a target frequency control voltage; and a frequency calibration control unit configured to combine a reference frequency control voltage corresponding to an expected frequency of a wobble signal and a phase change control voltage corresponding to a detected phase change of the band pass filter to provide the target frequency control voltage;

wherein the frequency calibration control unit comprises:

a phase detection circuit coupled between an input and an output of one of the serially connected band pass filters;

a charge pump responsive to the phase change detection circuit and configured to output a current based on the output of the phase detection circuit;

a loop filter having an input coupled to the charge pump and an output corresponding to the filtered output of the charge pump;

a band pass filter control voltage generator configured to receive the output of the loop filter and the reference frequency control voltage and output the target frequency control voltage to each of the serially connected band pass filters.

30. The wobble detection circuit of claim 29, wherein the frequency calibration control unit further comprises:

a first comparator coupled between an output of at least one of the one of the serially connected band pass filters and the phase detection circuit configured to compare an output of the one of the serially connected band pass filters to a reference voltage and output a signal corresponding to a difference between the output of the one of the serially connected band pass filters and the reference voltage to the phase detection circuit; and a second comparator coupled between an input of the at least one of the serially connected band pass filters and the phase detection circuit configured to compare an input of the one of the serially connected band pass filters to the reference voltage and output a signal corresponding to the difference between the input of the one of the serially connected band pass filters and the reference voltage to the phase detection circuit.

31. The wobble detection circuit of claim 29, wherein the loop filter comprises an RC filter including a resistance (R) coupled between an output of the charge pump and a reference voltage and a capacitance (C) coupled between the output of the charge pump and a ground voltage.

32. The wobble detection circuit of claim 29, wherein the band pass filter control voltage generator comprises:
  a first band pass filter transconductance control circuit coupled to the output of the loop filter and configured to output a first voltage corresponding to the output of the loop filter;
  a second band pass filter transconductance control circuit having as an input the reference frequency control voltage and configured to output a second voltage corresponding to the reference frequency control voltage; and
  a voltage summing circuit configured to sum the first and second voltages to provide the target frequency control voltage.

33. The wobble detection circuit of claim 32, wherein each of the first and second band pass filter transconductance control circuits comprise:
  a buffer amplifier coupled to an input of the band pass filter transconductance control circuit;
  an operational amplifier having a first input coupled to the reference voltage and a second input coupled to the output of the buffer amplifier;
  a transconductance amplifier coupled to the output of the operational amplifier; and
  a current to voltage converter coupled to the output of the transconductance amplifier to provide an output voltage of the band pass filter transconductance control circuit.

34. The wobble detection circuit of claim 33, wherein a first output of the buffer amplifier is coupled to the operational amplifier through a first resistance, the reference voltage is coupled to the operational amplifier through a second resistance, a first output of the operational amplifier is coupled to a first input of the operational amplifier through a third resistance and a second output of the operational amplifier is coupled to a second input of the operational amplifier through a fourth resistance.

35. A system for generating a wobble signal for an optical storage device, comprising:
  an adjustable center frequency ($\omega_0$) band pass filter configured to filter an input signal corresponding to the wobble signal to provide the wobble signal, said band pass filter comprising a plurality of serially connected band pass filters that respectively have an adjustable center frequency responsive to a target frequency control signal; and
  means for adjusting the center frequency ($\omega_0$) of the band pass filter based on an expected frequency of the wobble signal, said adjusting means comprising means for generating the target frequency control signal by combining a reference frequency control signal corresponding to an expected frequency of the wobble signal and a phase change control signal corresponding to a detected phase change of the band pass filter.

36. The system of claim 35, further comprising:
  means for estimating a position of an optical pick-up apparatus; and
  means for determining an expected frequency based on the estimated position of the optical pick-up apparatus.

37. The system of claim 36, wherein the estimated position is a position of the optical pick-up apparatus when the optical storage device is in an initial state.

38. The system of claim 36, wherein the estimated position is position of the optical pick-up apparatus after a jump in tracking of the optical pick-up apparatus.

39. The system of claim 35, further comprising:
  means for measuring the wobble signal; and
  means for determining the expected frequency based on the measured wobble signal.

40. The system of claim 35, further comprising:
  means for determining the expected frequency based on an estimated position of an optical pick-up apparatus if the optical storage device is in an initial state;
  means for determining the expected frequency based on an estimated position of an optical pick-up apparatus responsive to a jump in tracking of the optical pick-up apparatus the optical storage device; and
  means for determining the expected frequency based on a measure wobble signal if the expected frequency is not determined based on an estimated position of the optical pick-up apparatus.

41. The system of claim 40, further comprising:
  means for determining if adjustments to the center frequency of the band pass filter have reached a steady state; and
  means for switching from determining the expected frequency based on an estimated position of the optical pick-up apparatus to determining the expected frequency based on a measure of the wobble signal if the adjustments to the center frequency of the band pass filter have reached a steady state.

42. The system of claim 41, wherein the means for determining if adjustments to the center frequency of the band pass filter have reached a steady state comprises means for waiting a predetermined time after the initial state of the optical storage device or after a jump in tracking of the optical pick-up apparatus.

43. The system of claim 41, wherein the means for determining if adjustments to the center frequency of the band pass filter have reached a steady state comprises means for determining if a deviation in successive adjustment values to the band pass filter is within a predetermined threshold.

44. The system of claim 35, wherein the means for adjusting the center frequency comprises means for adjusting a transconductance of a transconductance-capacitance band pass filter based on the expected frequency of the wobble signal and the measured phase change of the band pass filter.

45. A system for generating a wobble signal from an optical disc, comprising:
  a system controller configured to generate a reference frequency control signal corresponding to an estimated position with respect to the optical disc of an optical pick-up apparatus that generates an input signal corresponding to the wobble signal read from the optical disc; and
  a wobble signal detection circuit configured to adjust a center frequency ($\omega_0$) of a band pass filter responsive to the reference frequency control signal and a phase change control signal corresponding to a detected phase change of the band pass filter, receive the input signal and band pass filter the input signal utilizing the adjusted center frequency to provide an output wobble signal, said band pass filter comprising a plurality of serially connected band pass filters that respectively have an adjustable center frequency responsive to a target frequency control signal generated by combining the reference frequency control signal and the phase change control signal.

46. The system of claim 45, wherein the wobble signal detection circuit is further configured to measure a phase change in the band pass filter and adjust $\omega_0$ of the band pass filter to reduce the measured phase change.

47. The system of claim 46, wherein the band pass filter of the wobble signal detection circuit comprises a transconductance-capacitance (Gm-C) filter.

48. The system of claim 47, wherein the wobble signal detection circuit is further configured to adjust the transconductance of the transconductance-capacitance filter based on the control signal and the measured phase change to adjust $\omega_0$ of the band pass filter.

49. The system of claim 46, wherein the system controller comprises:
- a wobble counter;
- a register responsive to the wobble counter;
- a microcontroller configured to output a first position estimate based on the generated wobble signal and to detect an initial state of the optical disc or a jump in tracking of the optical disc and generate a jump control signal;
- a firmware control unit configured to provide a second position estimate responsive to the jump control signal from the microcontroller;
- a multiplexer responsive to the microcontroller for selecting between the first position estimate of the microcontroller and the second position estimate of the firmware control unit; and
- a digital to analog converter coupled to the output of the multiplexer to convert the selected position estimate to generate the frequency control signal.

50. The system of claim 49, wherein the second position estimate and the first position comprise values corresponding to a frequency of the wobble signal associated with the respective position estimates.

51. The system of claim 45, wherein the system controller is configured to provide a first mode of operation where the frequency control signal is generated based on a position of a pick-up apparatus of the optical storage device and a second mode of operation where the frequency control signal is generated based on the generated wobble signal.

52. An optical storage device comprising the system for generating a wobble signal of claim 45.

53. A method of generating a wobble signal for an optical storage device, comprising:
- adjusting a center frequency ($\omega_0$) of a band pass filter based on an estimated position of an optical pick-up apparatus of the optical storage device, said band pass filter comprising a plurality of serially connected band pass filters that respectively have an adjustable center frequency responsive to a target frequency control signal generated by combining a reference frequency control signal corresponding to an expected frequency of the wobble signal and a phase change control signal corresponding to a phase change of the band pass filter; and
- filtering an input signal corresponding to the wobble signal from the pick-up apparatus with the adjusted band pass filter to provide the wobble signal.

54. The method of claim 53 further comprising:
measuring a phase change in the band pass filter; and
adjusting $\omega_0$ of the band pass filter to reduce the measured phase change.

55. The method of claim 54, wherein the band pass filter comprises a transconductance-capacitance (Gm-C) filter and wherein adjusting a center frequency comprises adjusting the transconductance of the transconductance-capacitance filter based on the control signal and the measured phase change to adjust $\omega_0$ of the band pass filter.

56. The method of claim 53, wherein in a first mode of operation the center frequency is adjusted based on a position of a pick-up apparatus of the optical storage device and in a second mode the center frequency is adjusted based on the generated wobble signal.

* * * * *